(12) United States Patent
Kenjo et al.

(10) Patent No.: US 10,264,087 B2
(45) Date of Patent: Apr. 16, 2019

(54) PROGRAM MEDIUM, CONTROL DEVICE, AND METHOD FOR ACCESS POINT NOTIFICATION

(71) Applicant: FUJITSU LIMITED, Kawasaki-shi (JP)

(72) Inventors: Kaoru Kenjo, Yokohama (JP); Shu Matsuoka, Shibuya (JP); Takahiro Shimazaki, Kawasaki (JP); Takashi Okamura, Yokohama (JP); Hidehiko Mayumi, Kawasaki (JP); Mitsuru Okajima, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 99 days.

(21) Appl. No.: 15/421,919

(22) Filed: Feb. 1, 2017

(65) Prior Publication Data

US 2017/0251071 A1  Aug. 31, 2017

(30) Foreign Application Priority Data

Feb. 29, 2016 (JP) .................................. 2016-037576

(51) Int. Cl.

| G06F 11/00 | (2006.01) |
| H04L 29/08 | (2006.01) |
| H04W 4/021 | (2018.01) |
| H04W 48/16 | (2009.01) |
| H04W 64/00 | (2009.01) |

(Continued)

(52) U.S. Cl.
CPC .............. *H04L 67/26* (2013.01); *G08B 21/10* (2013.01); *G08B 27/00* (2013.01); *H04L 67/18* (2013.01); *H04W 4/021* (2013.01); *H04W 4/90* (2018.02); *H04W 24/02* (2013.01); *H04W 48/16* (2013.01); *H04W 64/00* (2013.01); *H04W 64/003* (2013.01); *H04W 48/12* (2013.01); *H04W 84/12* (2013.01)

(58) Field of Classification Search
CPC .... H04L 69/40; H04L 12/1859; H04W 84/12; H04W 24/02
See application file for complete search history.

(56) References Cited

U.S. PATENT DOCUMENTS

2015/0237519 A1* 8/2015 Ghai ..................... H04W 24/10
                                                           380/270
2017/0085417 A1* 3/2017 O'Reirdan et al. ..........................
                                                           H04L 41/0668

FOREIGN PATENT DOCUMENTS

JP       2015-211251 A    11/2015

* cited by examiner

*Primary Examiner* — Bo Hui A Zhu
(74) *Attorney, Agent, or Firm* — Westerman, Hattori, Daniels & Adrian, LLP

(57) ABSTRACT

An access point notification method causing a control device that controls one or more access points to execute a process, the process include: identifying an access point based on disaster information and transmitting, to the access point, a transition instruction to instruct a transition of a setting of the access point to a disaster setting by which communication using a second identifier, different from a first identifier for which the access point allows communication, is allowed; transmitting to a notification server a request for authentication information; notifying the notification server of the information on the access point, using the authentication information; and causing the notification server to register the information on the access point the setting of which is transferred to the disaster setting and transmit a notification message to the terminal that is the distribution destination.

10 Claims, 25 Drawing Sheets

(51) Int. Cl.
*H04W 24/02* (2009.01)
*H04W 4/90* (2018.01)
*G08B 21/10* (2006.01)
*G08B 27/00* (2006.01)
*H04W 84/12* (2009.01)
*H04W 48/12* (2009.01)

FIG. 7

| DEVICE IP ADDRESS | OPEN CONDITION | | DETERMINATION CONDITION BY INSTALLATION LOCATION | |
|---|---|---|---|---|
| | DISASTER TYPE | DISASTER LEVEL | DEVICE INSTALLATION LOCATION | ADJACENT AREA |
| 192.168.0.1 | EARTHQUAKE | INTENSITY GREATER THAN 5 | 35 DEGREES, 40 MINUTES, 53.0 SECONDS NORTH LATITUDE, AND 139 DEGREES, 45 MINUTES, 57.9 SECONDS EAST LONGITUDE | AREA WITHIN ±10 MINS FROM LATITUDE AND LONGITUDE |
| 192.168.0.2 | TSUNAMI | ALARM | TAMA AREA | SURROUNDING AREA |
| | | | | |

FIG. 9

| PARAMETER | | PARAMETER VALUE |
|---|---|---|
| LATITUDE | REGISTERED SPOT LATITUDE | 35 DEGREES, 40 MINUTES, 53.0 SECONDS NORTH LATITUDE |
| LONGITUDE | REGISTERED SPOT LONGITUDE | 139 DEGREES, 45 MINUTES, 57.9 SECONDS EAST LONGITUDE |
| GENRE | SPOT USAGE | DISASTER ACCESS POINT |
| SPOT OVERVIEW | SSID | OOOOOJAPAN |
| EFFECTIVE TIME LIMIT | EXPIRATION DATE OF OPEN OF DISASTER AP | 10/02/2015 |
| POSITION INTERLOCKING SECTION RADIUS | AP COMMUNICATION AREA RADIUS | 40 m |
| SESSION ID | SESSION ID ISSUED FROM NOTIFICATION SERVER | SE01 |

FIG. 12

| PARAMETER | | PARAMETER VALUE |
|---|---|---|
| SPOT NUMBER | SPOT IDENTIFICATION INFORMATION | AP1 |
| LATITUDE | REGISTERED SPOT LATITUDE | 35 DEGREES, 40 MINUTES, 53.0 SECONDS NORTH LATITUDE |
| LONGITUDE | REGISTERED SPOT LONGITUDE | 139 DEGREES, 45 MINUTES, 57.9 SECONDS EAST LONGITUDE |
| GENRE | SPOT USAGE | DISASTER ACCESS POINT |
| SPOT OVERVIEW | SSID | 00000JAPAN |
| EFFECTIVE TIME LIMIT | EXPIRATION DATE OF OPEN OF DISASTER AP | 10/02/2016 |
| POSITION INTERLOCKING SECTION RADIUS | AP COMMUNICATION AREA RADIUS | 40 m |
| SESSION ID | SESSION ID ISSUED FROM NOTIFICATION SERVER | SE01 |

FIG. 18

| PARAMETER | OVERVIEW | DATA |
|---|---|---|
| SESSION ID | IDENTIFICATION INFORMATION OF SESSION USED FOR COMMUNICATION BETWEEN NOTIFICATION SERVER AND CONTROL DEVICE | SE02 |
| SPOT ID | SPOT ID ISSUED AT TIME OF SPOT REGISTRATION | AP1 |

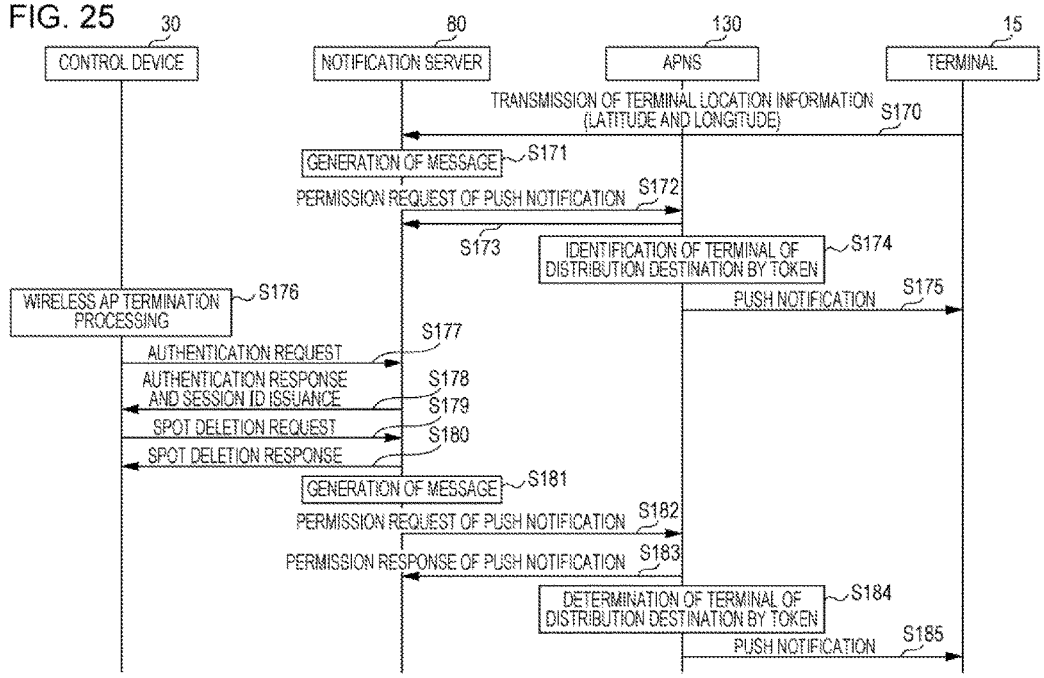

PROGRAM MEDIUM, CONTROL DEVICE, AND METHOD FOR ACCESS POINT NOTIFICATION

CROSS-REFERENCE TO RELATED APPLICATION

This application is based upon and claims the benefit of priority of the prior Japanese Patent Application No. 2016-037576, filed on Feb. 29, 2016, the entire contents of which are incorporated herein by reference.

FIELD

The embodiments discussed herein are related to an access point notification control program, a notification program, a control device, and a notification method.

BACKGROUND

When a disaster has occurred, in various aspects such as rescuing of victims, guiding of evacuation, management of an evacuation center, and restoration support, it is difficult to secure a communication unit. Recently, with the prevalence of user equipment such as a smartphone and a tablet in each of which a wireless local area network (LAN) function is provided, it has been expected that a wireless LAN is used as a communication unit when the disaster has occurred. For example, a guideline for a free public wireless LAN by an operator who provides a public wireless LAN service at the time of occurrence of a large-scale disaster has also been formulated. In addition to the operator, even in local governments and companies, it has been studied that a wireless LAN is opened in the event of a disaster. In addition, a wireless connection device has been proposed that establishes a wireless connection with an unspecified communication device in the event of a disaster, generates communication terminal information on a communication terminal located within a connection allowable range, and transmits the communication terminal information to a management server merely in the event of a disaster (Japanese Laid-open Patent Publication No. 2015-211251 and the like).

In addition, virtual network using software and software defined networking (SDN) that is a technology used to build a virtual network have drawn attention. In the SDN, a topology of a network and a quality of service (QoS) are set by software. Here, a control device called a controller in the network monitors communication statuses of devices included in the network and performs the control corresponding to the status of each of the devices.

Even when a wireless LAN is opened in the event of a disaster, a beacon from an access point (AP) of the opened wireless LAN does not reach a terminal that is not located within a range in which the communication with the access point is allowed to be performed. Therefore, in a case in which a user of the terminal is not in the range in which the beacon of the opened access point reaches the terminal, unless the user of the terminal moves to the location that the beacon of the access point reaches, the user does not notice that there is the opened access point.

An object of an embodiment is to cause the user of the terminal to recognize the open status of an access point easily.

SUMMARY

According to an aspect of the invention, an access point notification method causing a control device that controls one or more access points to execute a process, the process includes: identifying an access point based on disaster information and transmitting, to the access point, a transition instruction to instruct a transition of a setting of the access point to a disaster setting by which communication using a second identifier, different from a first identifier for which the access point allows communication, is allowed; transmitting to a notification server a request for authentication information used for registration of information to be provided to the terminal; notifying the notification server of the information on the access point, using the authentication information; and causing the notification server to register the information on the access point the setting of which is transferred to the disaster setting and transmit a notification message used to perform notification of the information on the access point to the terminal that is the distribution destination.

The object and advantages of the invention will b realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of an access point information table;

FIG. 9 is a diagram illustrating an example of information elements included in registration information;

FIG. 12 is a diagram illustrating an example of information elements included in, registration information;

FIG. 18 is a diagram illustrating an example of information elements included in deletion information;

FIG. 25 is a sequence diagram illustrating an example of a notification method of the approach to the access point and the termination of the open of the access point.

DESCRIPTION OF EMBODIMENTS

Figure 1:
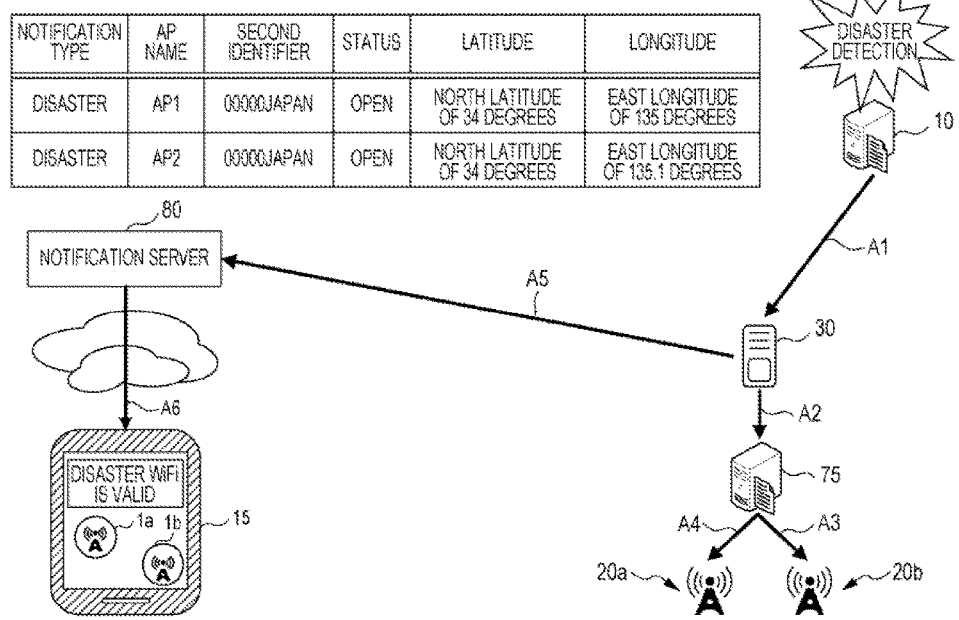
FIG. 1 is a diagram illustrating an example of a notification method according to an embodiment.

FIG. 1 is a diagram illustrating an example of a notification method according to an embodiment. In the example illustrated in FIG. 1, a plurality of access points 20 (20*a* and 20*b*) is included in a system. The access points 20 are coupled to a wireless LAN controller 75. It is assumed that a control device 30 is allowed to communicate with a disaster information alarm device 10, the wireless LAN controller 75, and a notification server 80. The notification server 80 is a server allowed to perform push notification. It is assumed that, for the notification server 80, setting processing used to perform push notification on a terminal 15 of a user who desires to check the opening status of an access point has been executed in advance. In addition, it is assumed that, for the notification server 80, setting processing used to perform push notification of information that had been notified from the control device 30 has been also executed. In addition, hereinafter, application of setting for the open of the access point 20 is referred to as "application of a disaster setting".

In the example of FIG. 1, each of the access points 20*a* and 20*b* performs communication using a first identifier in the initial state, and is set so as not to allow an access from a terminal that does not request communication using the first identifier.

In a case in which a disaster has occurred or a case in which a warning for a disaster has occurred, the disaster information alarm device 10 notifies the control device 30 of information related to the disaster (arrow A1).

The control device 30 identifies information related to the disaster using a control program used to perform disaster setting on an access point and determines an access point 20 that is a disaster setting target. Here, in the access point 20 to which the disaster setting has been applied, communication using a second identifier different from the first identifier is performed with an unspecified user. That is, the access point 20 to which the disaster setting has been applied is an access point 20 opened for the unspecified user in the event of a disaster. In the example of FIG. 1, it is assumed that the access points 20*a* and 20*b* are selected as targets to each of which the disaster setting is applied. When the control device 30 determines the access point 20 that is the target to which the disaster setting is applied, the control device 30 notifies the wireless LAN controller 75 of information on the determined access point 20 (arrow A2).

The wireless LAN controller 75 requests each of the access points 20*a* and 20*b* the information of which has been notified from the control device 30 to allow the unspecified user to perform communication using the second identifier (arrows A3 and A4).

In the arrow A5, the control device 30 also notifies the notification server 80 of the information on the access point 20 that is the disaster setting target. In the example of FIG. 1, the control device associates the notification type, the access point name (AP name), the second identifier, the status, the latitude, and the longitude with the information on each of the access points 20 on which the disaster setting is performed, and notifies the notification server 80 of the pieces of information. The notification type is the type of a cause by which the access point 20 is opened. The AP name is an identifier by which an access point 20 on which the disaster setting is performed is allowed to be uniquely identified. In the example of FIG. 1, "AP1" is allocated to the access point 20*a* as the AP name, and "AP2" is allocated to the access point 20*b* as the AP name. The second identifier is an identifier used when the associated access point 20 communicates with the unspecified user. In the example of FIG. 1, the second identifier is a service set identifier (SSID) of "00000JAPAN". The status is a value indicating the setting status of the notified access point 20. When "open" is set to "status", it is indicated that the access point 20 that is the notification target is a disaster setting target. The latitude and the longitude are respectively the latitude and the longitude at which the access point 20 that is the notification target is located.

When the notification server 80 obtains the information on the access point 20 to which the disaster setting is applied, from the control device 30, the notification server 80 generates information that is to be transmitted to a push notification destination of the information related to the disaster setting. For example, the notification server 80 may generate an image to which icons 1 (*a* and 1*b*) each indicating the position of the notified access point 20 have been added, on a map screen, as data that is to be transmitted to the terminal 15. In addition, the notification server 80 may generate information used to display, on the terminal 15, a character string indicating that there is an opened access point 20 in the vicinity of the terminal. The notification server 80 may perform push notification after having determined whether the access point 20 had been opened within a certain distance from the terminal 15, using location information on the terminal 15 that is the push notification destination and location information on the opened access point 20. For example, the notification server 80 may generate information used to display a character string such as "disaster prevention WiFi is valid" when the disaster setting has been performed on the access point 20 located within the certain distance from the location of the terminal 15.

In the arrow A6, the notification server 80 push-notifies the terminal 15 of the generated information. The terminal 15 displays the push-notified information on the display included in the terminal 15 as appropriate. In the example of FIG. 1, on the display of the terminal 15, a map indicating the position of the access point 20 that has been opened by the disaster setting using the icon 1 and a message indicating that the disaster prevention WiFi has become valid are displayed. The display message and the display image such as the map display may be generated by the terminal 15 using the information that has been received from the notification server 80.

As described above, in the system according to the embodiment, due to a notification of an occurrence of a disaster or a notification of a warning for a disaster from the disaster information alarm device 10, the disaster setting is applied to the access point 20 autonomously. In addition, the terminal 15 of the user is push-notified of the information on the access point 20 to which the disaster setting has been applied, through the notification server 80. Therefore, when the user of the terminal 15 checks the display of the screen, the user of the terminal 15 may know the presence or absence of an access point 20 to which the disaster setting has been applied before the user of the terminal 15 starts to communicate with the access point 20 to which the disaster setting has been applied. Thus, opportunity increases in which the user performs the communication through the access point 20 to which the disaster setting has been applied, and it becomes easier to provide information in the event of a disaster to the user of the terminal 15.

<Device Configuration>

Figure 2:
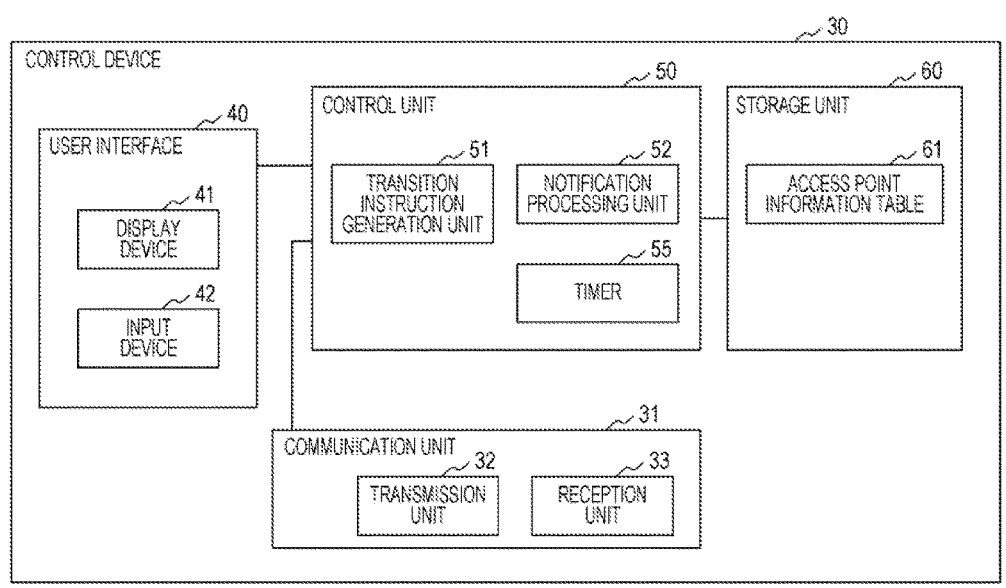
FIG. 2 is a diagram illustrating an example of a configuration of a control device.

FIG. 2 is a diagram illustrating an example of a configuration of the control device 30. The control device 30 includes a communication unit 31, a control unit 50, and a storage unit 60, and also includes a user interface 40 as an option. The communication unit 31 includes a transmission unit 32 and a reception unit 33. The reception unit 33 receives a packet from another device. The transmission unit 32 transmits a packet to another device.

The control unit 50 includes a transition instruction generation unit 51, a notification processing unit 52, and a timer 55. When the transition instruction generation unit 51 obtains notification of disaster information through the reception unit 33, the transition instruction generation unit 51 selects an access point that is an open target and executes processing in which the selected access point is opened. At the time of selection of an access point, the transition instruction generation unit 51 extracts pieces of information such as the disaster type, the scale, and the occurrence location of a disaster that has occurred, from the disaster information. The notification processing unit 52 generates a notification packet used to perform notification of information on the access point 20 for which the transition instruction generation unit 51 has requested the setting to be transferred to the disaster setting so as to transmit the notification packet to the notification server 80. The timer 55 measures an elapsed time after the transition instruction to the disaster setting had been output. When the elapsed time after the transition instruction to the disaster setting had been output becomes a certain threshold value or more, the transition instruction generation unit 51 determines that the disaster setting ends, and executes processing in which the disaster setting ends. At that time, the notification processing unit 52 generates a notification packet used to perform notification of the information on the access point 20 in which the transition instruction generation unit 51 has requested the disaster setting to end so as to transmit the notification packet to the notification server 80.

The storage unit 60 stores an access point information table 61, and further stores information used for the processing of the control unit 50 as appropriate. The access point information table 61 includes information on the access point controlled by the control device 30 through the wireless LAN controller 75. Differently from FIG. 1, in a system not including the wireless LAN controller 75, the control device 30 may control the access point 20 directly.

In the example of FIG. 2, a case is described in which the control device 30 includes a display device 41 and an input device 42 as the user interface 40, but the control device 30 may include the certain number of output devices and input devices each of which has a certain type.

Figure 3:
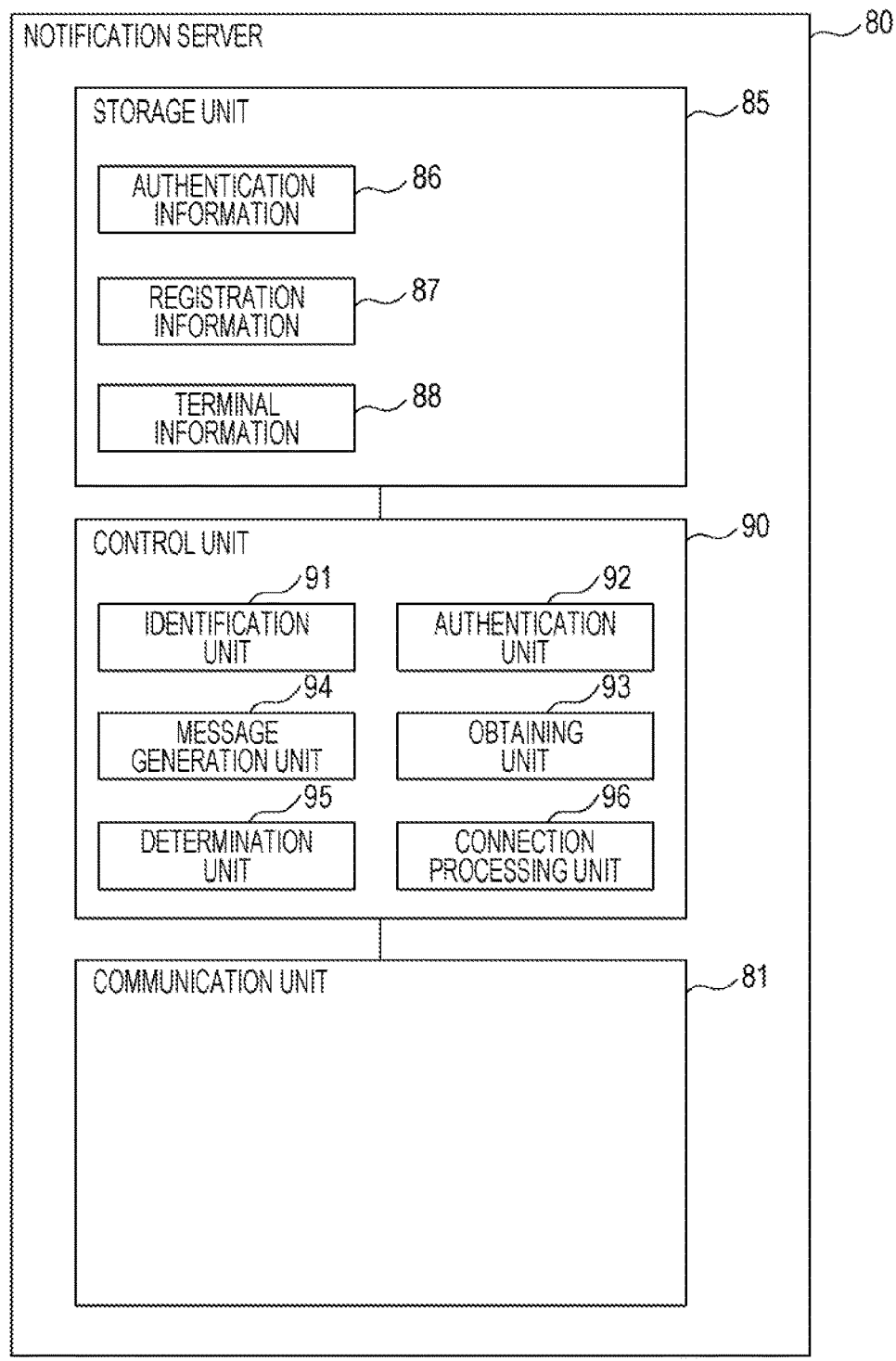
FIG. 3 is a diagram illustrating an example of a configuration of a notification server.

FIG. 3 is a diagram illustrating an example of a configuration of the notification server 80. The notification server 80 includes a communication unit 81, a storage unit 85, and a control unit 90. The communication unit 81 transmits and receives packets to and from other devices such as the terminal 15 and the control device 30.

The storage unit 85 stores authentication information 86, registration information 87, and terminal information 88. The authentication information 86 is information used for authentication processing of another device. The authentication information 86 includes, for example, information used when an authentication request is received from the control device 30. The registration information 87 is information on the target of which the notification server 80 notifies the terminal 15 through a push server. The registration information 87 is, for example, information on the access point 20 notified from the control device 30 or the like. The terminal information 88 is information on the terminal 15 that receives the notification of the registration information 87.

The control unit 90 includes an identification unit 91, an authentication unit 92, an obtaining unit 93, a message generation unit 94, a determination unit 95, and a connection processing unit 96. The identification unit 91 identifies information that has been obtained from the terminal 15 through the communication unit 81 and records the identified information as the terminal information 88. When the authentication has been requested, the authentication unit 92 executes authentication processing using the authentication information 86. The obtaining unit 93 obtains information that has been notified as a target of which the terminal is push-notified, from the reception packet from the control device 30. The obtaining unit 93 performs registration of the obtained information as the registration information 87. When the control device 30 has requested to delete the target of which the terminal is push-notified, the obtaining unit 93 deletes information that has been associated with the information in the reception packet, from the registration information 87. The message generation unit 94 generates a message of which the terminal is push-notified. The determination unit 95 determines whether a distance between the terminal 15 and the notification target that has been registered in the registration information 87 is a certain value or less. When the determination unit 95 has determined that distance between the terminal 15 and the notification target that has been registered in the registration information 87 is the certain value or less, the message generation unit 94 generates a message used to notify the terminal 15 of information indicating that the terminal 15 has approached the target that has been registered in the registration information 87. The connection processing unit 96 executes connection processing with another device, as appropriate. For example, the connection processing unit 96 establishes connection between the notification server 80 and the push server or the control device 30.

Figure 4:
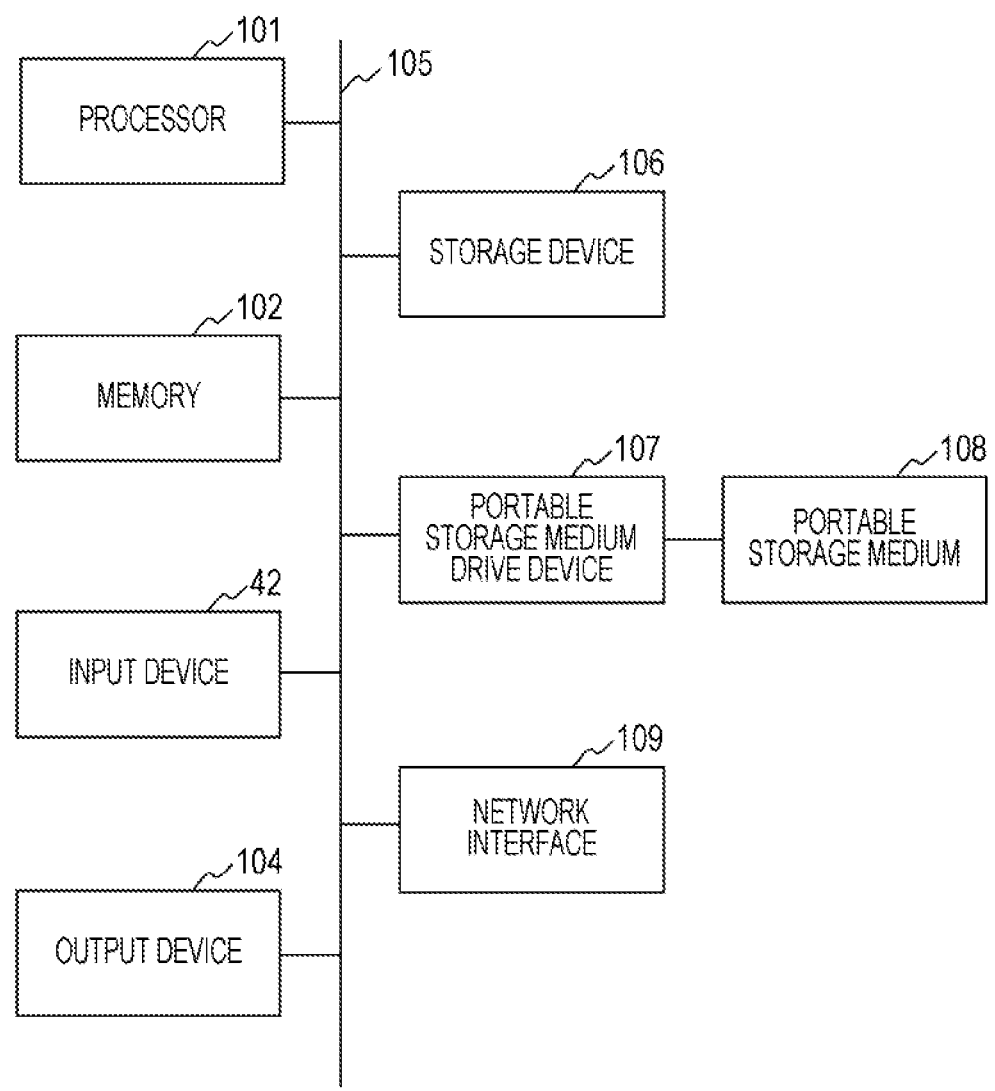
FIG. 4 is a diagram illustrating an example of a hardware configuration of each of the control device and the notification server.

FIG. 4 is a diagram illustrating an example of a hardware configuration of each of the control device 30 and the notification server 80. Each of the control device 30 and the notification server 80 includes a processor 101, a memory 102, a bus 105, and a network interface 109. Each of the control device 30 and the notification server 80 may further include one or more of an input device 42, an output device 104, a storage device 106, and a portable storage medium drive device 107.

The processor 101 is a certain processing circuit including a central processing unit (CPU), and may execute a program stored in the memory 102 or the storage device 106. The processor 101, the memory 102, the input device 42, the output device 104, the storage device 106, the portable storage medium drive device 107, and the network interface 109 are coupled to each other through the bus 105 so as to transmit and receive pieces of data to and from each other. The input device 42 is a certain device such as a keyboard or a mouse used to input information, and the output device 104 is a certain device such as the display device 41 including a display, which is used to output data. The portable storage medium drive device 107 may output data of the memory 102 or the storage device 106 to a portable storage medium 108, and may also read a program, data, and the like from the portable storage medium 108. Here, it may be assumed that the portable storage medium 108 is a certain portable storage medium including a compact disc recordable (CD-R) or a digital versatile disk recordable (DVD-R).

In the control device 30, the control unit 50 is obtained by the processor 101. In the control device 30, the memory 102 and the storage device 106 operate as the storage unit 60, and the network interface 109 operates as the communication unit 31. In addition, in the notification server 80, the processor 101 operates as the control unit 90. In the notification server 80, the memory 102 and the storage device 105 operate as the storage unit 85, and the network interface 109 operates as the communication unit 81.

Embodiment

A case in which a first identifier used for each of the access points before notification of a disaster information is an SSID set to the access point before occurrence of a disaster is described below as an example. In addition, it is assumed that a second identifier used for setting after the notification of the disaster information is an SSID used for communication caused by the free public access point due to the disaster. The second identifier may be a disaster unification SSID (00000JAPAN) recommended by a guideline as an SSID used for a free public access point, or may be another SSID. In addition, hereinafter, setting obtained after setting change has been performed due to notification of disaster information may be referred to as "disaster setting". That is, the disaster setting is setting by which communication using the second identifier is allowed to be performed.

Embodiments are described below so as to be divided into registration processing of the terminal 15, setting change of the access point 20, notification of the opened access point 20, notification of the approach to the opened access point 20, and processing at the time of the termination of the open of the access point 20. In the following description, as an example, a case is described below in which push notification to the terminal 15 from the notification server 80 is performed through google cloud messaging (GCM) 120, but the push server may be other than the GCM 120.

(1) Registration Processing of the Terminal 15

Figure 5:
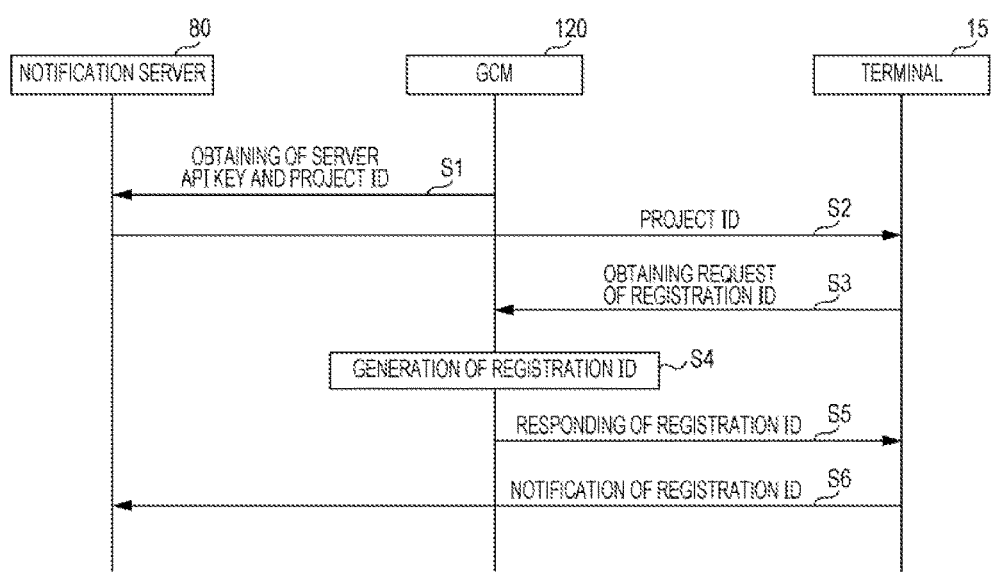
FIG. 5 is a sequence diagram illustrating an example of a registration method of a terminal.

FIG. 5 is a sequence diagram illustrating an example of a registration method of the terminal 15 that receives information on the access point 20 the setting of which has been transferred to the disaster setting. It is assumed that an application used when a push notification is received is installed in the terminal 15 in advance.

The communication unit 81 of the notification server 80 receives information used to identify information on a transmission source in a notification destination from the GCM 120 when the communication unit 81 performs notification of the information on the access point 20 the setting of which has been transferred to the disaster setting (Step S1). In the example of FIG. 5, as the information used to identify the information on the transmission source, a server API key and a project ID are used. The server API key is issued to the application used for the push notification through the GCM 120, and is used to identify an application in the GCM 120. In addition, the project ID is an identifier used when the terminal 15 that receives the push notification identifies an application used to process data that has been transmitted by the push notification. When the message generation unit 94 of the notification server 80 obtains the server API key and the project ID, the message generation unit 94 stores both of the server API key and the project ID.

The identification unit 91 sets the project ID to an application that operates in the terminal 15 so as to transmit the project ID to the terminal 15 (Step S2). Therefore, the terminal 15 requests a registration ID used as an identifier that identifies a terminal 15, for the GCM 120 (Step S3). The GCM 120 generates a registration ID that is to be allocated to the terminal 15, and notifies the terminal 15 of the generated registration ID (Steps S4 and S5). After that, the terminal 15 associates the registration ID with the server API key and notifies the notification server 80 of the registration ID and the server API key (Step S6). When the identification unit 91 obtains the registration ID through the communication unit 81, the identification unit 91 stores the registration ID in the storage unit 85 as the terminal information 88. Therefore, in the sequent processing, each of the notification server 80 and the GCM 120 may identify the terminal 15 that is the notification destination using the registration ID.

(2) Setting Change of the Access Point

An example of processing when setting of one or more of access points, is changed by the control device 30 depending on an occurrence of a disaster or the like is described below. In the following description, for simplicity of the explanation, a case is described as an example in which the control device 30 controls the access points directly, but the control device 30 may indirectly control the access points 20 through the wireless LAN controller 75 as illustrated in FIG. 1.

Figure 6:
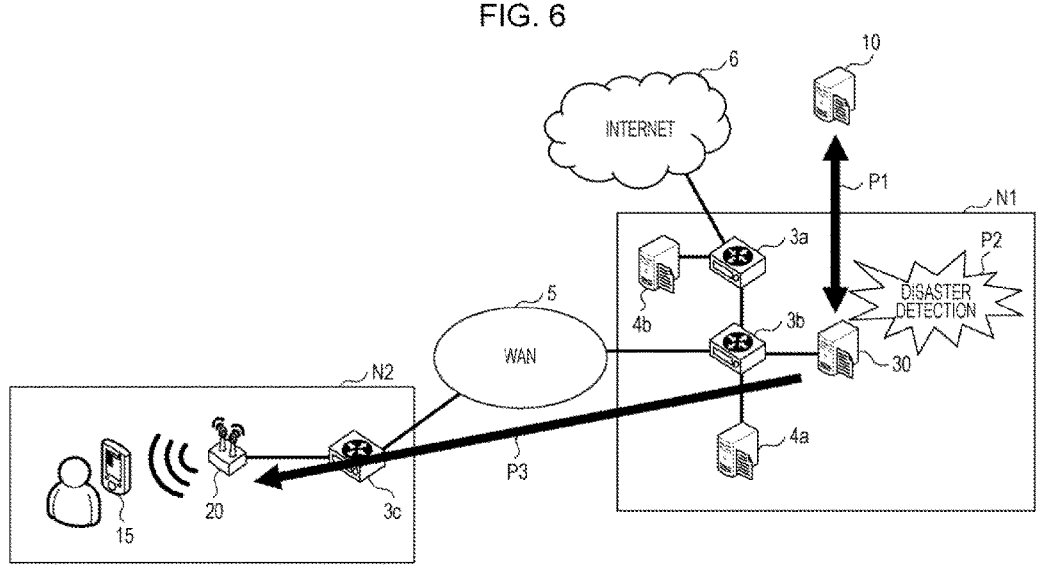
FIG. 6 is a diagram illustrating an example of a change method of setting of an access point.

FIG. 6 is a diagram illustrating an example of a change method of setting of an access point. In the example of FIG. 6, a network N1 and a network N2 are coupled to each other through, a wide area network (WAN) 5, and the network N1 is coupled to the Internet 6. The network N1 includes the control device 30 and routers 3 (3a and 3b). The network N1 may include communication devices 4 (4a and 4b) in addition to the control device 30, as options. When SDN is used for the configuration of the networks N1 and N2, the control device 30 may operate as an SDN controller.

The network N2 includes a router 3c and an access point 20. It is assumed that the access point 20 is set so as to perform communication using a first identifier in the initial state and not to allow an access from a terminal that does not request communication using the first identifier. In addition, it is assumed that the terminal 15 does not hold the first identifier used in the access point 20. Therefore, in the initial state, even when the access point 20 receives an establishment request of communication from the terminal 15, the access point 20 does not allow the communication for the terminal 15.

As illustrated in the procedure P1, the control device 30 communicates with the disaster information alarm device 10. When a disaster has occurred or a warning for a disaster has occurred, the disaster information alarm device 10 notifies the control device 30 of information related to the disaster.

In the procedure P2, the transition instruction generation unit 51 of the control device 30 identifies the information related to the disaster using a packet that has been received from the disaster information alarm device 10 while identifying an access point 20 that is a target of a disaster setting. Here, it is assumed that the access point 20 to which the disaster setting has been applied communicates with the unspecified user using a second identifier different from the first identifier. It is assumed that the second identifier is information held in the terminal 15 in advance or information allowed to be obtained by the terminal 15 due to an occurrence of the disaster. For example, the second identifier may be a disaster unification SSID. An example of the identification method of an access point 20 that is a target to which the disaster setting is applied is described later with reference to FIG. 7.

After that, the transition instruction generation unit 51 transmits an instruction used to perform setting of the access point 20 that is the disaster setting target (procedure P3). It is assumed that the access point 20 is set so as to be allowed to perform communication using the second identifier, based on the instruction that has been received in the procedure P3.

At that time, the access point 20 has been set so as to perform communication using the second identifier, so that the terminal 15 may perform communication through the access point 20 when the terminal 15 requests the connection using the second identifier. Thus, when the user of the terminal 15 notices that the access point 20 has been opened, the user may communicate with a device on the network N1, a device in the Internet 6, or the like, through the access point 20.

As described above, in the setting change method according to the embodiment, the control device 30 determines an access point 20 that is an open target, based on disaster information, and executes processing in which the determined access point 20 is opened. Thus, setting change that corresponds to a notification content from the disaster information alarm device 10 is performed by the system autonomously.

FIG. 7 is a diagram illustrating an example of the access point information table 61. The access point information table 61 includes, for each of the access points 20, a device IP address that has been allocated to the access point 20, an open condition, and a determination condition by an installation location. The open condition corresponds to a combination of the disaster type and the disaster level. The determination condition by the installation location includes pieces of setting information of a device installation location and an area adjacent to the device installation location. When a range that has been specified as the device installation location or the adjacent area is notified of disaster information related to a disaster that matches the open condition, the access point 20 becomes a disaster setting target. The device installation location or the adjacent area may be set using the latitude and the longitude, or may be set using an area name and map information. For example, when an earthquake with intensity greater than 5 occurs in an area within 10 minutes from the latitude and the longitude from 35 degrees, 40 minutes, 53.0 seconds north latitude, and 139 degrees, 45 minutes, 57.9 seconds east longitude, the access point 20 to which an IP address of 192.168.0.1 has been allocated becomes an application disaster setting target. In addition, the access point 20 to which the IP address of 192.168.0.2 has been allocated is located at the Tama area and becomes an application disaster setting target when a tsunami warning is issued for one of the Tama area and an area set as the surrounding area of the Tama area. When the installation location and the adjacent area are set using an area name and map information, the control device 30 also holds the map information in the storage unit 60. In addition, it is assumed that the control device 30 also holds setting information on the surrounding area in addition to the map information. For example, it is assumed that the eastern area of Tokyo 23 wards, the western area of Tokyo 23 wards, and the eastern area of Kanagawa prefecture are set as the surrounding area of the Tama area. In this case, when a tsunami warning is issued for one of the eastern area of Tokyo 23 wards, the western area of Tokyo 23 wards, and the eastern area of Kanagawa prefecture, the access point 20 the IP address of which is 192.168.0.2 becomes the application disaster setting target.

Figure 8:
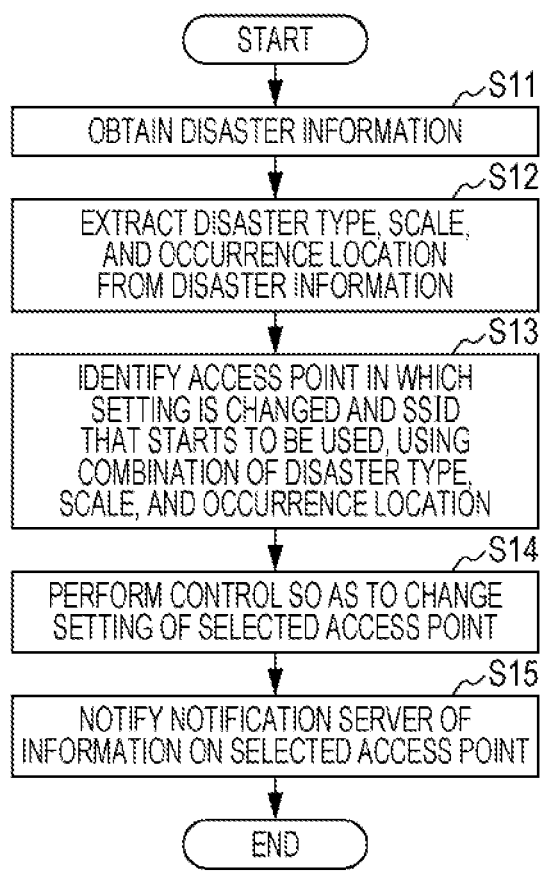
FIG. 8 is a flowchart illustrating an example of the change method of setting of an access point.

FIG. 8 is a flowchart illustrating an example of the change method of setting of the access point. The transition instruction generation unit 51 selects a packet including disaster information from among input packets (Step S11). Here, the disaster information alarm device 10 is a Japan Meteorological Agency disaster prevention server, a device that is a transmission source of, a nationwide warning system (J-Alert), a private system server that performs notification of disaster information, or the like. In addition, the transition instruction generation unit 51 stores an internet protocol (IP) address that has been allocated to a device that operates as the disaster information alarm device 10, information on a webpage on which the disaster information has been published, and information on a transmission source of a mail, and the like. Therefore, the transition instruction generation unit 51 selects a packet including the disaster information using the pieces of stored information such as the address and the like, and obtains the disaster information from the selected packet. The transition instruction generation unit 51 extracts the disaster type, the disaster scale, and the disaster occurrence location from the disaster information (Step S12).

After that, the transition instruction generation unit 51 selects an access point 20 to which the disaster setting is to be applied, using a combination of the disaster type, the disaster scale, and the disaster occurrence location included in the disaster information. In addition, the transition instruction generation unit 51 identifies an SSID used for the disaster setting (Step S13). The SSID used for the disaster setting is a second identifier used for communication between the unidentified terminal 15 and the access point 20 in the disaster setting.

In Step S14, the transition instruction generation unit 51 performs control so as to change the setting of the selected the access point 20. After that, the notification processing unit 52 notifies the notification server 80 of the information on the access point 20 that has been identified as the access point 20 to which the disaster setting is to be applied (Step S15).

FIG. 8 is an example of the processing, and the processing may be changed depending on an implementation. For example, the processing of Step S15 may be executed before the processing of Step S14, and the pieces of processing of Steps S14 and S15 may be executed in parallel.

(3) Notification of an Opened Access Point

When the setting change of the access point 20 is performed by the processing described above with reference to FIGS. 6 to 8, the notification processing unit 52 notifies the notification server 80 of the information on the access point 20 that has been opened by the setting change. The notification server 80 stores information on a target (spot), of which the notification server 80 notifies the terminal 15, with an identification number of the spot and a session ID used for communication with the control device 30 that has requested the registration of the spot. Therefore, the notification processing unit 52 of the control device 30 notifies the notification server 80 of the information on the access point 20 that has been opened by the setting change by transmitting the information as the registration information of the target, of which the notification server 80 notifies the terminal 15.

FIG. 9 is a diagram illustrating an example of information elements included in the registration information transmitted to the notification server 80. In the example of FIG. 9, the notification server 80 is notified of the latitude, the longitude, the genre, the spot overview, the effective time limit, the position interlock segment radius, and the session ID of the opened access point 20 as the registration information. The genre corresponds to the purpose of the spot registered in the notification server 80. In addition, as the spot overview, a description related to the spot and information used when the spot is used are registered. In the example of FIG. 9, the spot overview corresponds to an SSID allowed to be used for communication with the opened access point 20. The effective time limit is information used to identify a date in which the processing ends in which the notification server 80 notifies the terminal 15 of the information on the spot. The position interlock segment radius is a distance between the terminal 15 and the spot when the notification server 80 notifies the terminal 15 of information indicating that the terminal 15 is approaching the spot. For example, the radius of a communication area established by the opened access point 20 may be used as the position interlock segment radius. In this case, when the terminal 15 enters the communication area of the opened access point 20, the notification server 80 notifies the terminal 15 of information indicating that the terminal 15 is located in the vicinity of the access point 20. The session ID is identification information used to identify a session used when the notification server 80 and the control device 30 communicate with each other. The obtaining of the session ID is described later with reference to FIG. 10.

For example, when an access point 20 located at 35 degrees, 40 minutes, 53.0 seconds north latitude, and 139 degrees, 45 minutes, 57.9 seconds east longitude is opened, the control device 30 notifies the notification server 80 of the information indicated by a data string of FIG. 9 as registration information. In the example of FIG. 9, a value of "disaster access point" is set as the genre, and the second identifier used for the opened access point 20 is notified as the spot overview. In the example of FIG. 9, as the second identifier, an SSID of "00000JAPAN" is registered. The effective time limit is a date in which the open of the access point 20 that is the notification target ends, and in the example of FIG. 9, the effective time limit is Oct. 2, 2016. In addition, the position interlock segment radius is 40 m, and the session ID is SE01.

FIG. 9 is an example of the information of which the control device 30 notifies the notification server 80 when the access point 20 is opened. The information elements of which the control device 30 notifies the notification server 80 when the access point 20 is opened may be changed depending on an implementation. For example, the control device 30 may notify the notification server 80 of information other than the information included in FIG. 9.

Figure 10:
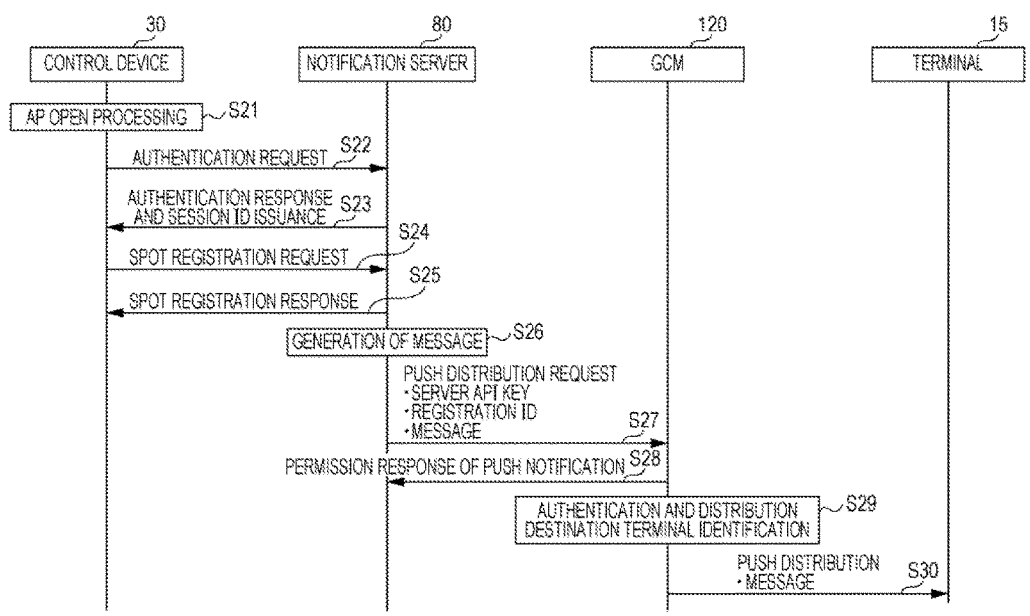
FIG. 10 is a sequence diagram illustrating an example of a notification method of an opened access point.

FIG. 10 is a sequence diagram illustrating an example of a notification method of the opened access point. An example of communication processing executed until the terminal 15 is notified of the information on the opened access point 20 is described below with reference to FIG. 10. FIG. 10 is, an example of the processing, and a procedure of the processing may be changed depending on an implementation. For example, the processing order of Steps S28 and S29 may be changed.

The transition instruction generation unit 51 of the control device 30 executes opening processing of an access point 20 by the processing described above with reference to FIGS. 6 to 8 (Step S21). Therefore, the notification processing unit 52 requests the notification server 80 to execute the authentication processing (Step S22) in order to start to communicate with the notification server 80. Here, Step S22 is executed when the notification processing unit 52 causes the notification server 80 to register registration information.

The authentication unit 92 of the notification server 80 executes the authentication processing using the authentication information 86. When the authentication unit 92 performs authentication of the control device 30 successfully, the authentication unit 92 generates a session ID of a session used when the control device 30 and the notification server 80 communicate with each other, causes the session ID to be included in an authentication response, and transmits the session ID and the authentication response to the control device 30 (Step S23).

The notification processing unit 52 of the control device 30 obtains the session ID by obtaining the authentication response through the reception unit 33. The notification processing unit 52 generates a spot registration request including the registration information of which the notification server 80 is notified, using the obtained session ID and information on the access point that has been opened by the transition instruction generation unit 51. For example, when the session ID is SE01, the registration information illustrated in FIG. 9 is generated. The spot registration request is a control message used to request the notification server 80 to register a spot (access point 20) identified by the registration information as a notification target to the terminal 15. Thus, the session ID that has been notified by the authentication response is used as the authentication information used when the control device 30 requests the notification server 80 to register the registration information. The notification processing unit 52 transmits the generated spot registration request to the notification server 80 through the transmission unit 32 (Step S24).

When the obtaining unit 93 of the notification server 80 obtains the spot registration request through the communication unit 81, the obtaining unit 93 generates a spot number used to identify the information on the access point 20, which has been notified by the spot registration request. The spot number is an identification number used to uniquely identify the information on the spot, which is stored in the notification server 80 as the registration information 87, and is identification information used to identify the notified access point 20 in the case of FIG. 10. For example, it is assumed that the obtaining unit 93 generates a spot number of "AP1" for the single access point 20 that has been notified in Step S24. After that, the obtaining unit 93 associates the information that has been notified by the spot registration request with the generated spot number and stores the information and the spot number. In addition, the obtaining unit 93 generates a spot registration response including the spot number associated with the access point 20 that has been notified by the spot registration request, and transmits the generated spot registration response to the control device 30 through the communication unit 81 (Step S25). When the control device 30 receives the spot registration response, the control device 30 associates the notified information on the access point 20 with the spot number and records the information and the spot number.

In addition, the message generation unit 94 of the notification server 80 generates a notification message used to push-notify the terminal 15 of the information on the opened access point 20. Here, it is assumed that the message generation unit 94 stores a template used to generate one or more notification messages for each of the genres. In the example of FIG. 10, it is assumed that the message generation unit 94 stores a character string of "a WiFi station at the latitude YY the longitude XX has been switched into a disaster free public access point", as a template used to perform notification when registration of a condition in which the genre corresponds to a disaster access point has been performed. The message generation unit 94 generates a character string that has been obtained by causing the latitude and the longitude of the access point that is the notification target to be included in the template, as the notification message. For example, when the notification of the information illustrated in FIG. 9 has been performed, the message generation unit 94 generates a message of "a WiFi station at 35 degrees, 40 minutes, 510 seconds north latitude, and 139 degrees, 45 minutes, 57.9 seconds east longitude has been switched into a disaster free public access point" (Step S26).

The message generation unit 94 identifies a registration ID associated with a server API key of an application used for notification of the information that has been obtained from the control device 30. The message generation unit 94 transmits the generated message to the GCM 120 through the communication unit 81, with the identified registration ID and the server API key (Step S27).

The GCM 120 transmits a permission response of push notification to the notification server 80 (Step S28). In addition, the GCM 120 executes the authentication processing and identifies a terminal 15 that is a distribution destination, using the registration ID that has been notified from the notification server 80 (Step S29). When the authentication has been performed successfully, the GCM 120 associates the notification message that has been notified from the notification server 80 with the project ID and transmits the notification message and the project ID to the terminal 15 identified by the registration ID (Step S30). The project ID transmitted from the GCM 120 to the terminal 15 in Step S30 is a project ID of the application used for the notification of the information that has been obtained from the control device 30.

Figure 11:
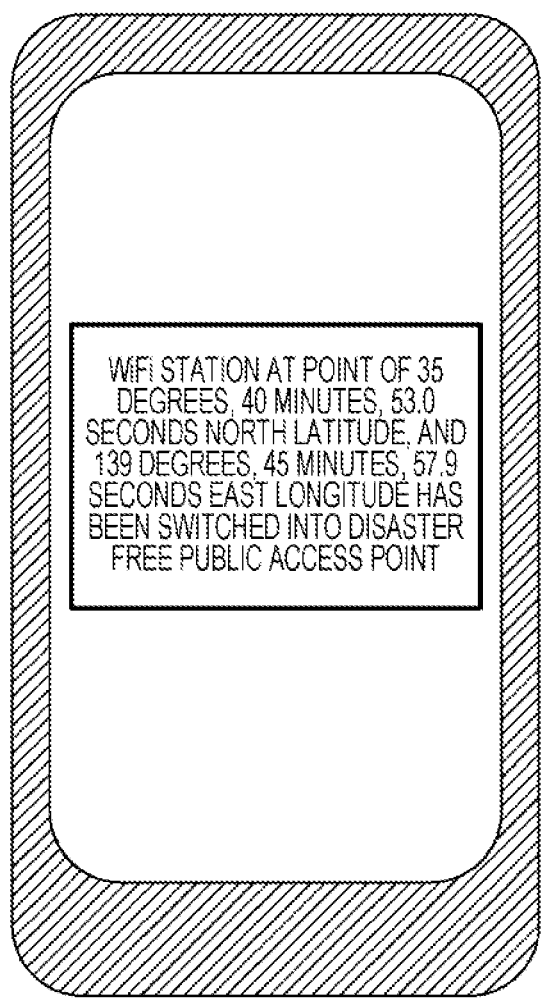
FIG. 11 is a diagram illustrating a display example in the terminal.

FIG. 11 is a diagram illustrating a display example in the terminal 15. In the example of FIG. 11, the terminal 15 displays a pop-up message that has been received from the GCM 120 on the screen of the display included in the terminal 15. FIG. 11 is an example of the display of the terminal 15, and the display format may be changed depending on an implementation arbitrary. For example, in the terminal 15, by processing of the application identified by the project ID, the latitude and the longitude in the received notification message are extracted, and a map in which a mark is applied to the point that has been notified by the notification message may be generated and displayed. In addition, the map in which the mark has been applied to the point that had been notified by the notification message is displayed on the screen, and then the pop-up notification message may be displayed so as not to overlap with the display position of the mark.

As described above, by the processing described with reference to FIG. 10, the terminal 15 is notified of the information on the opened access point 20. By the processing of Steps S24 and S25 in FIG. 10, the spot number that has been generated in the notification server 80 is associated with the opened access point 20.

FIG. 12 is a diagram illustrating an example of information elements included in registration information, in which information on an opened access point 20 and the spot number are associated with each other. In the processing of Step 24 in FIG. 10, the notification server 80 generates the spot number for the notified access point 20, so that, as illustrated in FIG. 12, the notification server 80 stores information that has been obtained by associating the information that has been notified in FIG. 9 with the spot number in Step S24 and the subsequent steps. In addition, in the processing of Step S25, the notification server 80 notifies even the control device 30 of the spot number, so that the control device 30 associates the spot number that has been notified by a spot registration response with the information that has been notified by the spot registration request, and registers the spot number and the information. Therefore, the control device 30 also holds the registration information illustrated in FIG. 12. Thus, in the following processing, the registration information illustrated in FIG. 12 is used in both of the control device 30 and the notification server 80.

Figure 13:
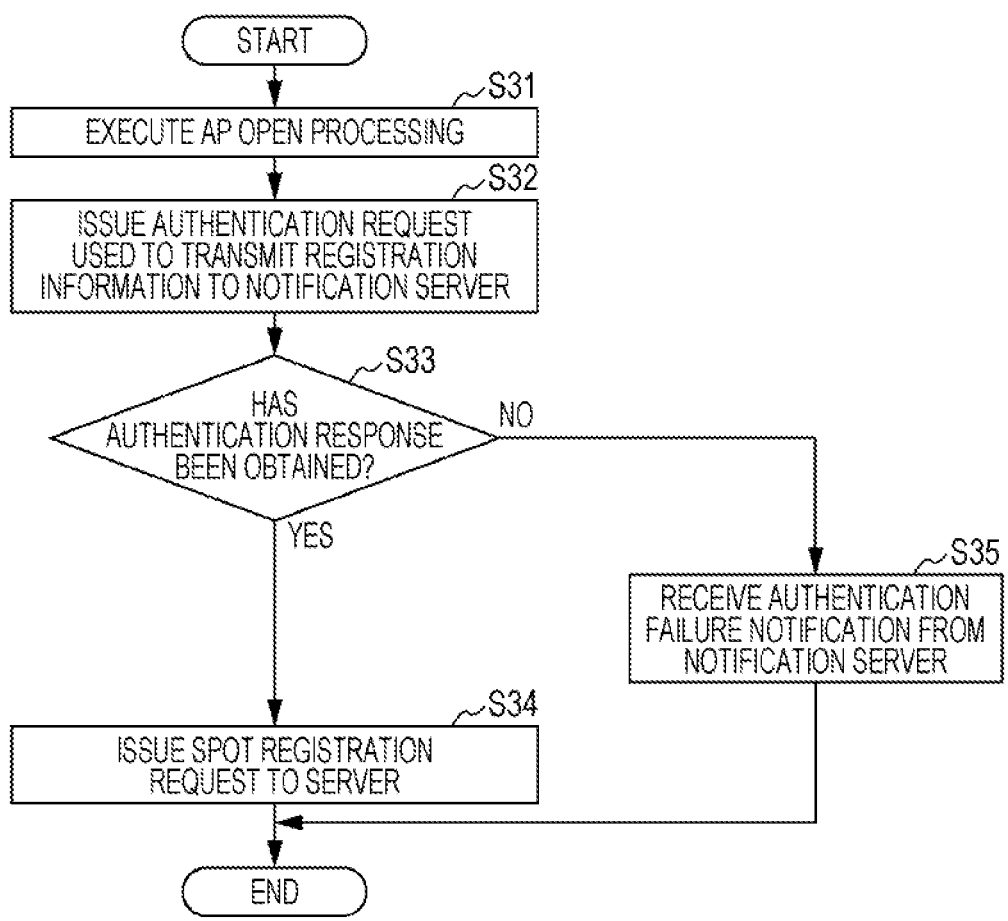
FIG. 13 is flowchart illustrating an example of processing executed by the control device at the time of notification of an opened access point.

FIG. 13 is a flowchart illustrating an example of processing executed by the control device 30 at the time of notification of an opened access point 20. First, the transition instruction generation unit 51 executes processing in which the access point 20 is opened (Step S31). Such processing corresponds to Step S21 of FIG. 10. The notification processing unit 52 issues an authentication request used to transmit registration information to the notification server 80 (Step S32). Such processing corresponds to Step S22 of FIG. 10. When the authentication has been performed successfully in the notification server 80, an authentication response is transmitted from the notification server 80 to the control device 30. Such processing corresponds to Step S23 of FIG. 10. Therefore, the notification processing unit 52 determines whether the authentication response has been obtained from the notification server 80 (Step S33). When the authentication response has been obtained from the notification server 80, the notification processing unit 52 issues a spot registration request to the notification server 80 (Yes in Step S33, and Step S34). Such processing corresponds to Step S24 of FIG. 10. In addition, when the authentication information is not obtained from the notification server 80, the authentication is not performed successfully in the notification server 80, so that the control device 30 receives an authentication failure notification from the notification server 80 (No in Step S33, and Step S35). When the control device 30 receives the authentication failure notification, the notification processing unit 52 ends a series of processing.

Figure 14:
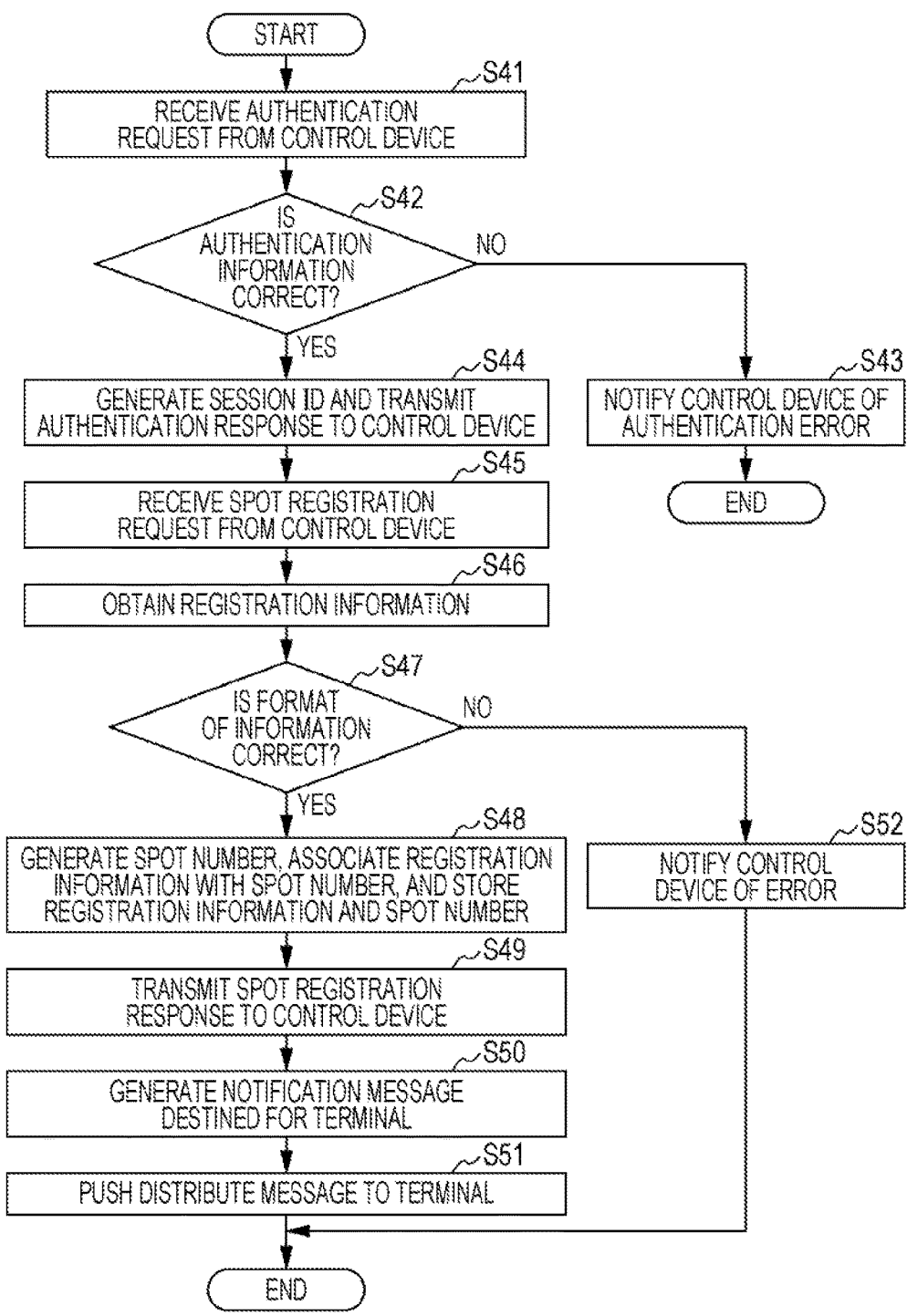
FIG. 14 is a flowchart illustrating an example of processing executed by the notification server at the time of notification of the opened access point.

FIG. 14 is a flowchart illustrating an example of processing executed by the notification server 80 at the time of notification of the opened access point. FIG. 14 is an example of the processing, and a procedure of the processing may be changed depending on an implementation. For example, Step S49 may be executed after Steps S50 and S51.

When an authentication request is received from the control device 30, the authentication unit 92 determines whether information used for the authentication (authentication information) is correct (Steps S41 and S42). When the authentication information is not correct, the authentication unit 92 notifies the control device 30 of an authentication error through the communication unit 81 (No in Step S42, and Step S43). In addition, when the authentication information is correct, the authentication unit 92 generates a session ID used to identify a session used for communication with the control device 30, and transmits an authentication response to the control device 30 (Yes in Step S42, and Step S44). After that, the communication unit 81 receives a spot registration request from the control device 30 (Step S45). The obtaining unit 93 obtains the registration information included in the spot registration request (Step S46). The obtaining unit 93 determines whether the format of the obtained registration information is correct (Step S47). Here, when information having a format determined to be the format of the registration information 87 has been obtained in advance, the obtaining unit 93 determines that the format of the obtained information is correct. When the format of the obtained registration information is not correct, the obtaining unit 93 notifies the control device 30 of a format error of the information, and ends a series of processing (No in Step S47, and Step S52).

When the format of the registration information is correct, the obtaining unit 93 generates a spot number, associates the registration information with the spot number, and registers the registration information and the spot number (Yes in Step S47, and Step S48). The obtaining unit 93 transmits a spot registration response including the spot number, to the control device 30, through the communication unit 81 (Step S49). In addition, the message generation unit 94 generates a notification message destined for the terminal 15 (Step S50). The notification message includes information on the access point 20, in which it has been notified that the setting is transferred to the disaster setting by the spot registration request. The communication unit 81 push-distributes the notification message to the terminal 15 (Step S51).

(4) Notification of an Approach to an Opened Access Point

Figure 15:
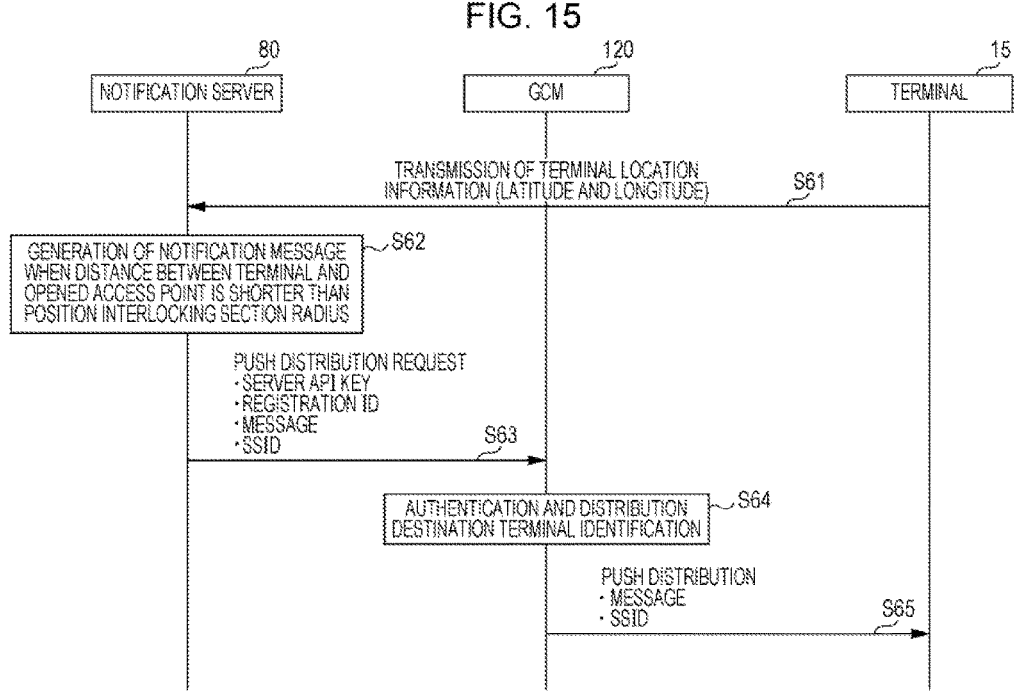
FIG. 15 is a sequence diagram illustrating an example of a method in which the terminal is notified of information indicating the terminal has approached the opened access point.

FIG. 15 is a sequence diagram illustrating an example of a method in which the terminal is notified of information indicating the terminal has approached the opened access point 20. An example of processing executed when the terminal 15 has approached the access point 20 is described with reference to FIG. 15. Here, "approach to an access point 20" indicates that a distance from the terminal 15 to the access point 20 is a certain threshold value or less. The certain threshold value is determined depending on an implementation, and may be the same value as the radius of the communication area established by the access point 20, or may be a value obtained by increasing or decreasing the radius of the communication area generated by the access point 20 by a certain proportion. In the following description, a case in which the certain threshold value is the radius of the communication area of the opened access point 20 is described as an example.

In Step S61, the terminal 15 periodically transmits the latitude and the longitude at the location of the terminal 15 to the notification server 80 as location information on the terminal 15. The determination unit 95 obtains a distance between the terminal 15 and the access point 20 using the position that has been notified from the terminal 15 and the latitude and the longitude of the access point 20 that is the spot registration target. Any calculation method when the distance between the terminal 15 and the access point 20 is obtained is employed.

The determination unit 95 determines whether the distance between the terminal 15 and the access point 20 is the radius of the communication area of the opened access point 20 or less. Here, the radius of the communication area of the opened access point 20 is stored in the registration information (FIG. 12) as the position interlock segment radius. When the distance between the terminal 15 and the access point 20 is the position interlock segment radius or less, the message generation unit 94 generates a notification message used to notify the terminal 15 of the information on the opened access point 20 (Step S62).

The message generation unit 94 generates a notification message used to push-notify the terminal 15 of information indicating that the terminal is approaching the opened access point 20. In the example of FIG. 15, as a template used for notification when the terminal 15 has approached the spot in which the genre corresponds to a disaster access point, it is assumed that a character string of "the terminal 15 has entered a communication area of a WiFi station at a point of the latitude ○ ○ the longitude ○ ○" is stored. The message generation unit 94 generates a character string that has been obtained by including the latitude and the longitude of the access point that is the notification target in the template, as the notification message. Thus, when the terminal 15 has approached the access point 20 illustrated in FIG. 12, the message generation unit 94 generates the notification message of "the terminal 15 has entered the communication area of the WiFi station at 35 degrees, 40 minutes, 53.0 seconds north latitude, and 139 degrees, 45 minutes, 57.9 seconds east longitude".

The message generation unit 94 identifies a registration ID associated with a server API key of the application used for notification of the information that has been obtained from the control device 30. The message generation unit 94 outputs the obtained server API key, the registration ID, and the generated message to the communication unit 81. At that time, the message generation unit 94 also outputs the information on the second identifier registered as the spot overview of the access point 20 that is the notification target in the registration information 87, to the communication unit 81. In the example of FIG. 12, as the second identifier used for communication with the access point 20 that is the notification target, the SSID of "00000JAPAN" is recorded. The communication unit 81 transmits the input message to the GCM 120, with the identified registration ID, the server API key, and the second identifier used for the communication with the access point 20 that is the notification target (Step S63).

The GCM 120 executes the authentication processing and identifies a terminal 15 that is a distribution destination using the registration ID that, has been notified from the notification server 80 (Step S64). When the authentication has been performed successfully, the GCM 120 associates, with the project ID, the second identifier used for communication with the access point 20 that is the notification target and the notification message that has been notified from the notification server 80, and transmits the project ID, the second identifier, and the notification message to the terminal 15 identified by the registration ID (Step S65). In Step S65, the project ID associated with the server API key of which the notification server 80 has notified the GCM 120 in the processing of Step S1 of FIG. 5 is transmitted to the terminal 15.

Figure 16:
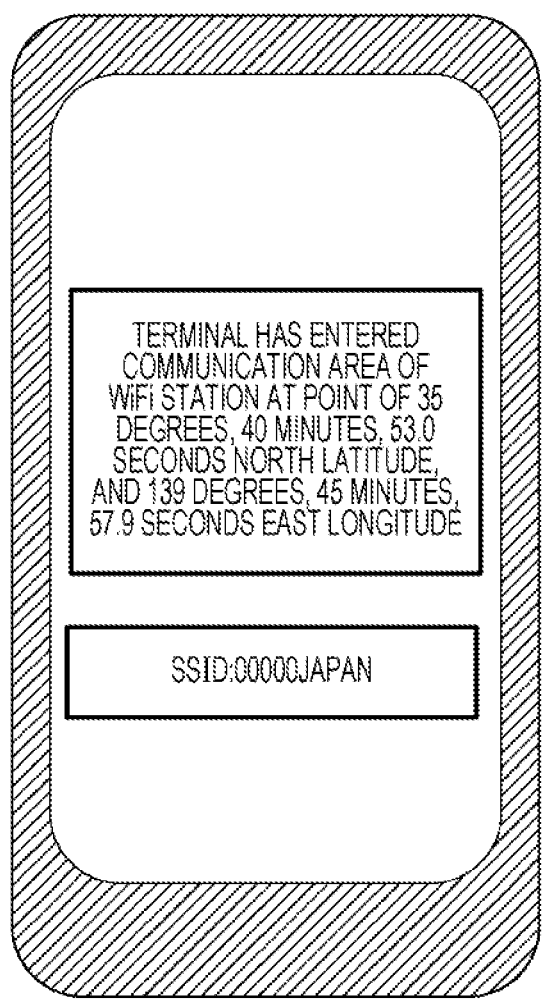
FIG. 16 is a diagram illustrating a display example in the terminal.

FIG. 16 is a diagram illustrating a display example in the terminal 15. In the example of FIG. 16, the terminal 15 displays the pop-up message that has been received from the GCM 120 on the screen of the display. FIG. 16 is an example of the display in the terminal 15, and the display format may be changed depending on an implementation arbitrary. For example, similar to the case in which registration of the access point 20 has been performed, the map display may be performed, and display using the map display and the pop-up display in combination may be performed.

Figure 17:
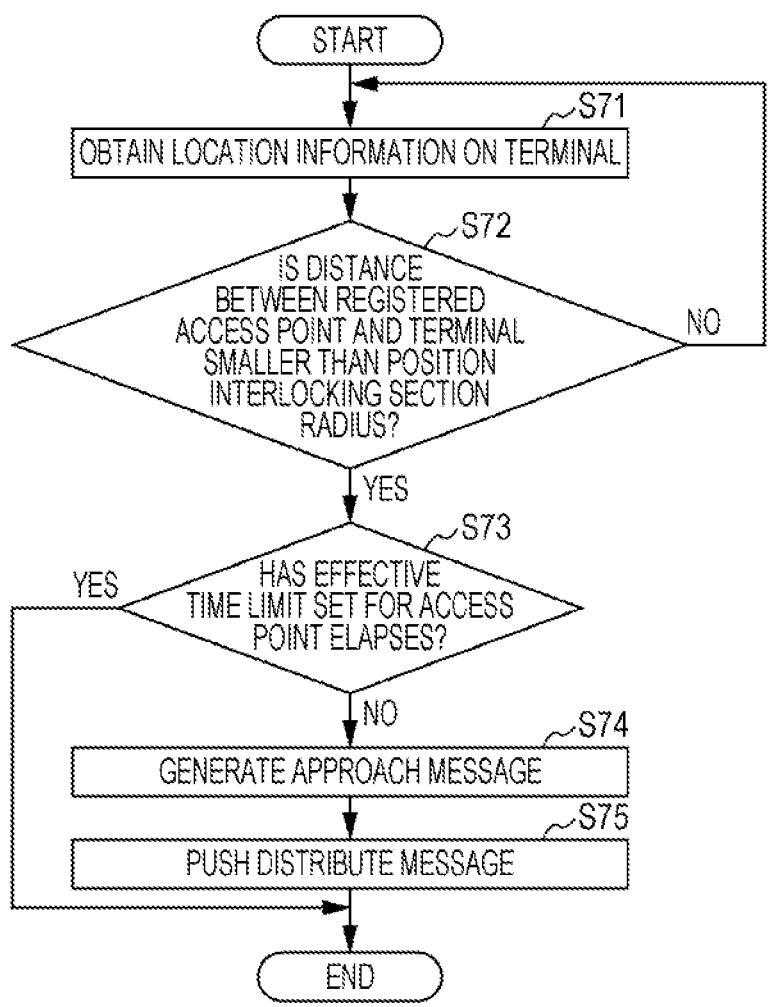
FIG. 17 is a flowchart illustrating an example of processing executed by the notification server when the terminal is notified of information indicating the terminal has approached the opened access point.

FIG. 17 is a flowchart illustrating an example of processing executed by the notification server 80 when the terminal is notified of information indicating the terminal has approached the opened access point. In FIG. 17, as an example, a case is described in which the terminal 15 is notified of the approach to the access point merely when the effective time limit that has been set for the access point 20 does not elapse. The notification server 80 is notified of the effective time limit as a time in which the disaster setting (open) of the access point 20 ends, as described above with reference to FIGS. 10, 12, and the like.

The determination unit 95 obtains location information on the terminal 15 from the terminal 15 (Step S71). The determination unit 95 determines whether the distance between the access point 20 and the terminal 15, which is registered as the registration information 87, is less than the position interlock segment radius (Step S72). When the registered distance between the access point 20 and the terminal 15 is the position interlock segment radius or more, the flow returns to Step S71 (No in Step S72).

In addition, when the determination unit 95 has determined that the distance between the opened access point 20 and the terminal 15 is less than the position interlock segment radius, the message generation unit 94 determines whether the effective time limit set for the access point 20 has elapsed (Yes in Step S72, and Step S73). When the effective time limit of the access point 20 in which the distance with the terminal 15 is less than the position interlock segment radius has elapsed, the open of the access point 20 ends, so that the message generation unit 94 ends a series of processing (Yes in Step S73). When the effective time limit of the access point 20 in which the distance with the terminal 15 is less than the position interlock segment radius does not elapse, the message generation unit 94 generates an approach message (No in Step S73, and Step S74). Here, the approach message is a message used to perform notification of information indicating that the terminal 15 is approaching the opened access point 20. The message generation unit 94 push-distributes the generated approach message to the terminal 15 through the communication unit 81 (Step S75).

As described above, by the processing described above, with reference to FIGS. 15 to 17, the terminal 15 that has entered the communication area of the opened access point 20 is notified of the information indicating that the terminal 15 is approaching the access point 20. In addition, the terminal 15 is also notified of the second identifier, so that processing in which the user causes the terminal 15 to be coupled to the access point 20 becomes convenient when the user of the terminal 15 desire to perform communication using the access point 20.

(5) Processing at the Time of Termination of the Open of an Access Point

As described above with reference to FIG. 17, in a case in which the effective time limit elapses, even when the terminal 15 enters the communication area of the access point 20 on which the spot registration has been performed, the notification server 80 does not notify the terminal 15 of information indicating that the terminal 15 is approaching the access point 20. However, when the open has ended, the control device 30 may request the notification server 80 to delete the spot registration. An example of processing executed when the control device 30 requests the notification server 80 to delete the spot registration is described below.

In the control device 30, the transition instruction generation unit 51 monitor whether a time that elapses after the issuance of an open instruction exceeds a time period in which the access point 20 is opened, using the timer 55, for each of the opened access points 20. When the time that elapses after the issuance of the open instruction exceeds the time period in which the access point 20 is opened, the transition instruction generation unit 51 generates an instruction used not to allow communication using the second identifier, for each of the opened access points 20. The transition instruction generation unit 51 transmits the generated instruction to the access point 20 in which the disaster setting is caused to end. Therefore, in each of the access points 20 in which the end of the disaster setting has been requested, the permission of the communication using the second identifier ends in accordance with the notification from the control device 30. When the control device 30 controls the access point 20 through the wireless LAN controller 75, the control device 30 transmits an end request of the disaster setting to the wireless LAN controller 75 with the identification information on the access point 20 in which the disaster setting is caused to end. Therefore, the wireless LAN controller 75 ends the disaster setting for the access point 20 that has been specified by the control device 30.

When transmission of the instruction used not to allow the communication using the second identifier is performed, the notification processing unit 52 notifies the notification server 80 of information on the access point 20 in which the disaster setting has ended. At that time, the notification processing unit 52 transmits the information on the access point 20 in which the disaster setting has ended, to the notification server 80 as a deletion request of the spot information stored in the notification server 80.

FIG. 18 is a diagram illustrating an example of information elements included in deletion information. In the example of FIG. 18, the notification server 80 is notified of a session ID and a spot number allocated to the access point 20 for in which the disaster setting is caused to end as deletion information. The spot number is information that has been generated to identify an access point 20 when the access point 20 that is a registration deletion target had been registered in the notification server 80. The session ID is identification information that identifies a session used when the notification server 80 and the control device 30 communicate with each other, and of which the notification server 80 notifies the control device 30 at the time of authentication performed prior to transmission and reception of the deletion information. In the following processing, the session ID is used as authentication information when the control device 30 requests the notification server 80 to delete the registration information.

For example, when the disaster setting is caused to end in the access point 20 located at 35 degrees, 40 minutes, 53.0 seconds north latitude, and 139 degrees, 45 minutes, 57.9 seconds east longitude, the information indicated by a data string of FIG. 18 is used as the registration information. In the example of FIG. 18, the session ID is SE02, and the spot number is AP1. The notification processing unit 52 generates deletion information by identifying a spot number using the information (FIG. 12) stored in the control device 30. FIG. 18 is an example of the deletion information, and an information element included in the deletion information may be changed depending on an implementation.

Figure 19:
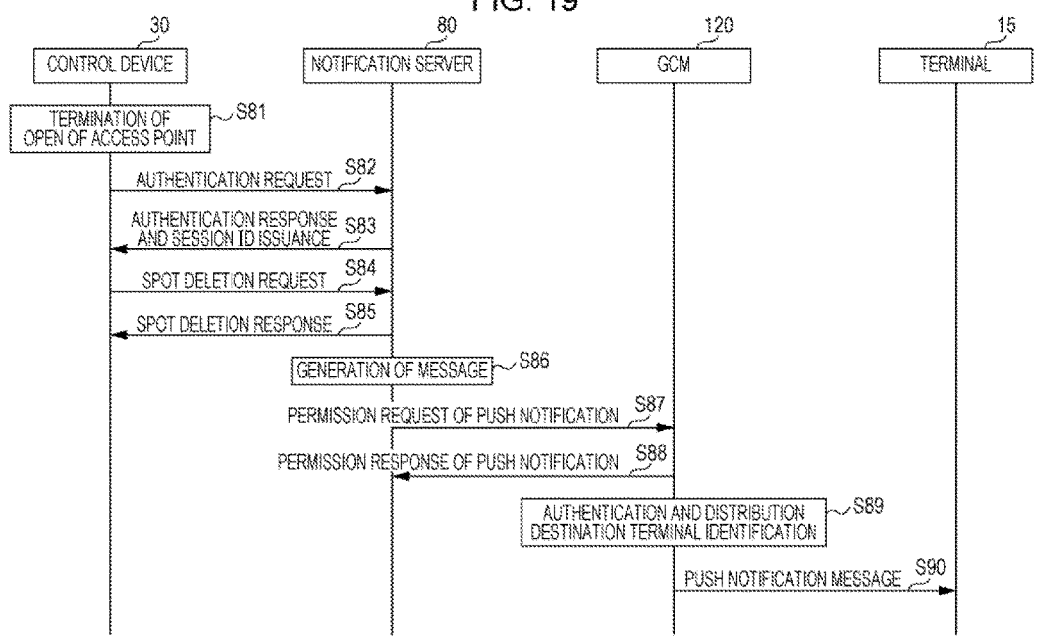
FIG. 19 is a sequence diagram illustrating an example of a notification method of the termination of the open of the access point.

FIG. 19 is a sequence diagram illustrating an example of a notification method of the termination of the open of an access point. An example of communication processing executed until the terminal 15 is notified of information on the access point 20 in which the open has ended is described below with reference to FIG. 19. The processing in FIG. 19 is merely an example, and a procedure of the processing may be changed depending on an implementation. For example, the processing order of Steps S88 and S89 may be changed.

The transition instruction generation unit 51 of the control device 30 executes processing in which the wireless access point is opened (Step S81). Therefore, the notification processing unit 52 requests the notification server 80 to execute the authentication processing in order to notify the notification server 80 of the deletion information (Step S82). The authentication of the control device 30 has been performed successfully, the authentication unit 92 of the notification server 80 generates a session ID of a session used when the control device 30 and the notification server 80 communicate with each other, causes the session ID to be included in an authentication response, and transmits the session ID and the authentication response to the control device 30 (Step S83). The notification processing unit 52 of the control device 30 obtains the session ID by obtaining the authentication response through the reception unit 33.

The notification processing unit 52 generates a spot deletion request including the registration information of which the control device 30 is notified, using the information on the access point 20 in which the disaster setting has ended by the transition instruction generation unit 51 and the session ID that has been obtained in Step S83. An example of the deletion information included in the spot deletion request is as illustrated in FIG. 18. The spot deletion request is a control message used to request the notification server 80 to delete a spot (access point 20) identified by the deletion information from the notification target to the terminal 15. The notification processing unit 52 transmits the generated spot deletion request to the notification server 80 through the transmission unit 32 (Step S84).

When the obtaining unit 93 of the notification server 80 obtains the spot deletion request, the obtaining unit 93 deletes the information that has been associated with the spot number notified by the spot deletion request, from the registration information 87. Therefore, in the notification server 80 that has received the spot deletion request including the deletion information illustrated in FIG. 18, the information illustrated in FIG. 12 is deleted from the registration information 87. In addition, the obtaining unit 93 generates a response for the spot deletion request (spot deletion response), and transmits the spot deletion response to the control device 30 through the communication unit 81 (Step S85). When the control device 30 has received the spot deletion response, the control device 30 determines that the notified information on the access point 20 has been deleted from the notification target to the terminal 15.

In addition, the message generation unit 94 of the notification server 80 generates a notification message used to push-notify the terminal 15 of the information on the access point 20 in which the open has ended. At that time, the message generation unit 94 uses a template used for notification when the condition in which the genre corresponds to a disaster access point has been deleted. For example, it is assumed that the message generation unit 94 stores a character string of "the disaster free public WiFi station at the latitude ○ ○ the longitude ○ ○ has ended" as a template. The message generation unit 94 generates a character string that has been obtained by including the latitude and the longitude of the access point that is the notification target in the template, as a notification message. Thus, when notification of the information illustrated in FIG. 18 has been performed, the message generation unit 94 generates a notification message of "the disaster free public WiFi station at the point of the north latitude 35 degrees 40 minutes 53.0 seconds and the east longitude 139 degrees 45 minutes 57.9 seconds, has ended." (Step S85).

The message generation unit 94 identifies a registration ID associated with a server API key of the application used for the notification of the information that has been obtained from the control device 30. The notification server 80 outputs the generated message to the communication unit 81 with the identified registration ID and the server API key. Therefore, the communication unit 81 transmits the information that has been input from the message generation unit 94, to the GCM 120 (Step S87). The processing of Steps S88 to S90 is similar to the processing of Steps S28 to S30 described above with reference to FIG. 10.

Figure 20:
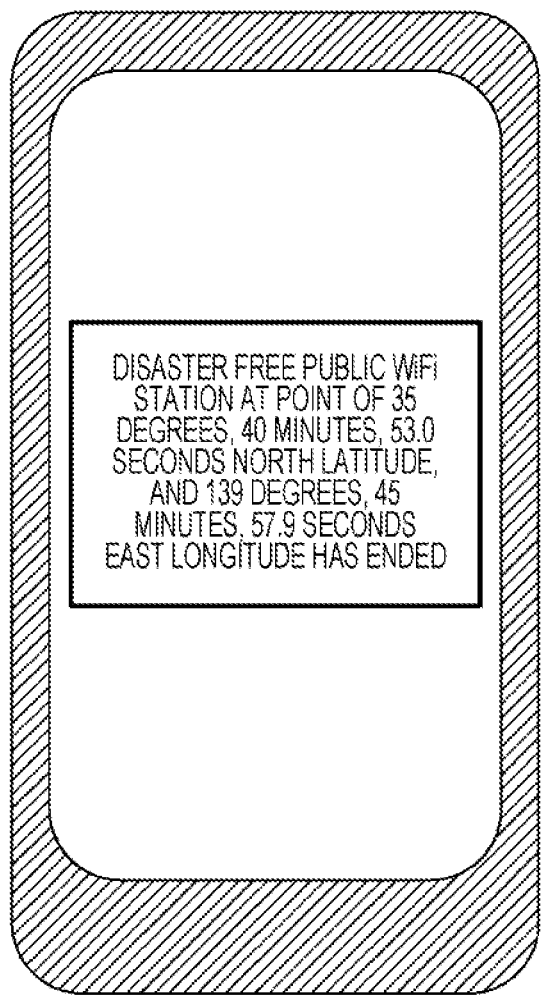
FIG. 20 is a diagram illustrating a display example in the terminal.

FIG. 20 is a diagram illustrating a display example in the terminal 15. FIG. 20 is an example of the display in the terminal 15, and the display format may be changed depending on an implementation arbitrary. For example, similar to the case in which the registration of the access point 20 has been performed, the map display may be performed, and display using the map display and the pop-up display in combination may be performed. When the map display is used, it is assumed that the display is performed so that the user recognizes that the open of the access point 20 has ended so that the color of the display of the access point 20 the open of which has ended is different from the display color at the time of open.

Figure 21:
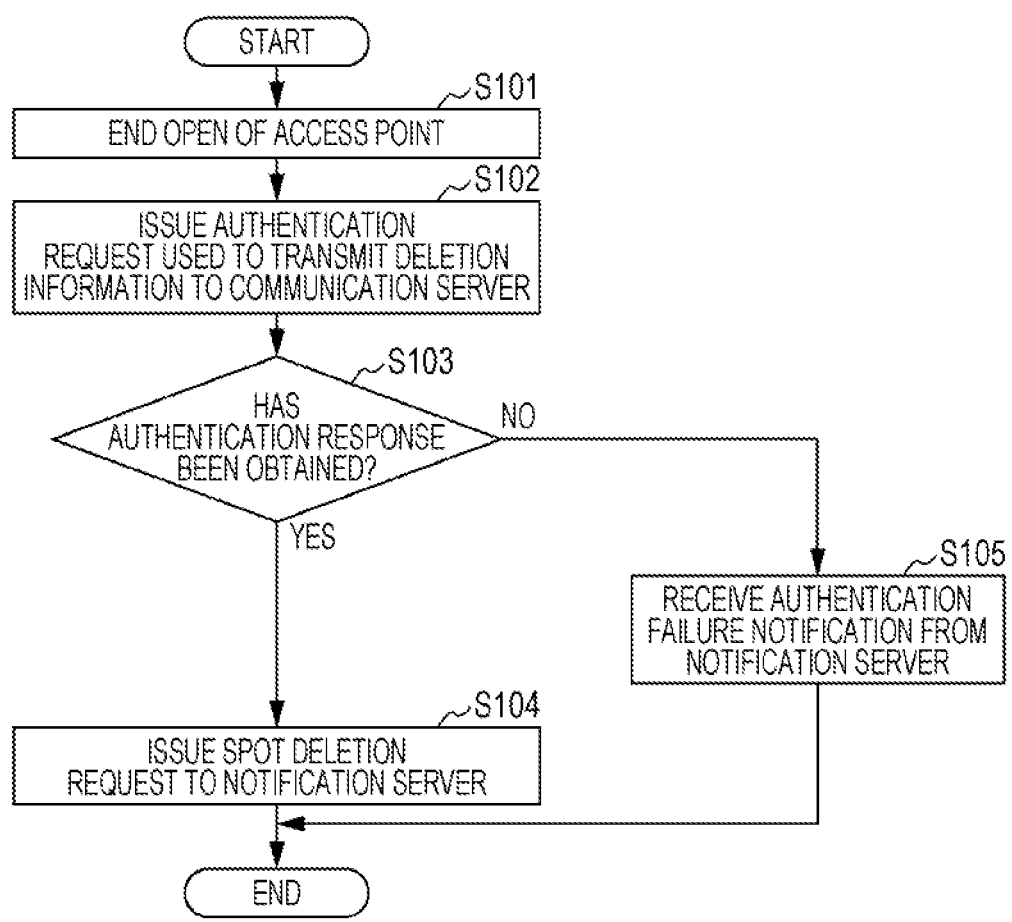
FIG. 21 is a flowchart illustrating an example of processing executed by the control device at the time of notification of the termination of the open of the access point.

FIG. 21 is a flowchart illustrating an example of processing executed by the control device at the time of notification of the termination of the open of the access point 20. First, the transition instruction generation unit 51 executes processing in which the open of the wireless access point 20 ends (Step S101). The notification processing unit 52 issues an authentication request used to transmit deletion information to the notification server 80 (Step S102). The notification processing unit 52 determines whether an authentication response has been obtained from the notification server 80 (Step S103). When the authentication response has been obtained from the notification server 80, the notification processing unit 52 issues a spot deletion request to the notification server 80 (Yes in Step S103, and Step S104). In addition, when an authentication failure notification has been received from the notification server 80, the notification processing unit 52 ends a series of processing (Yes in Step S105).

Figure 22:
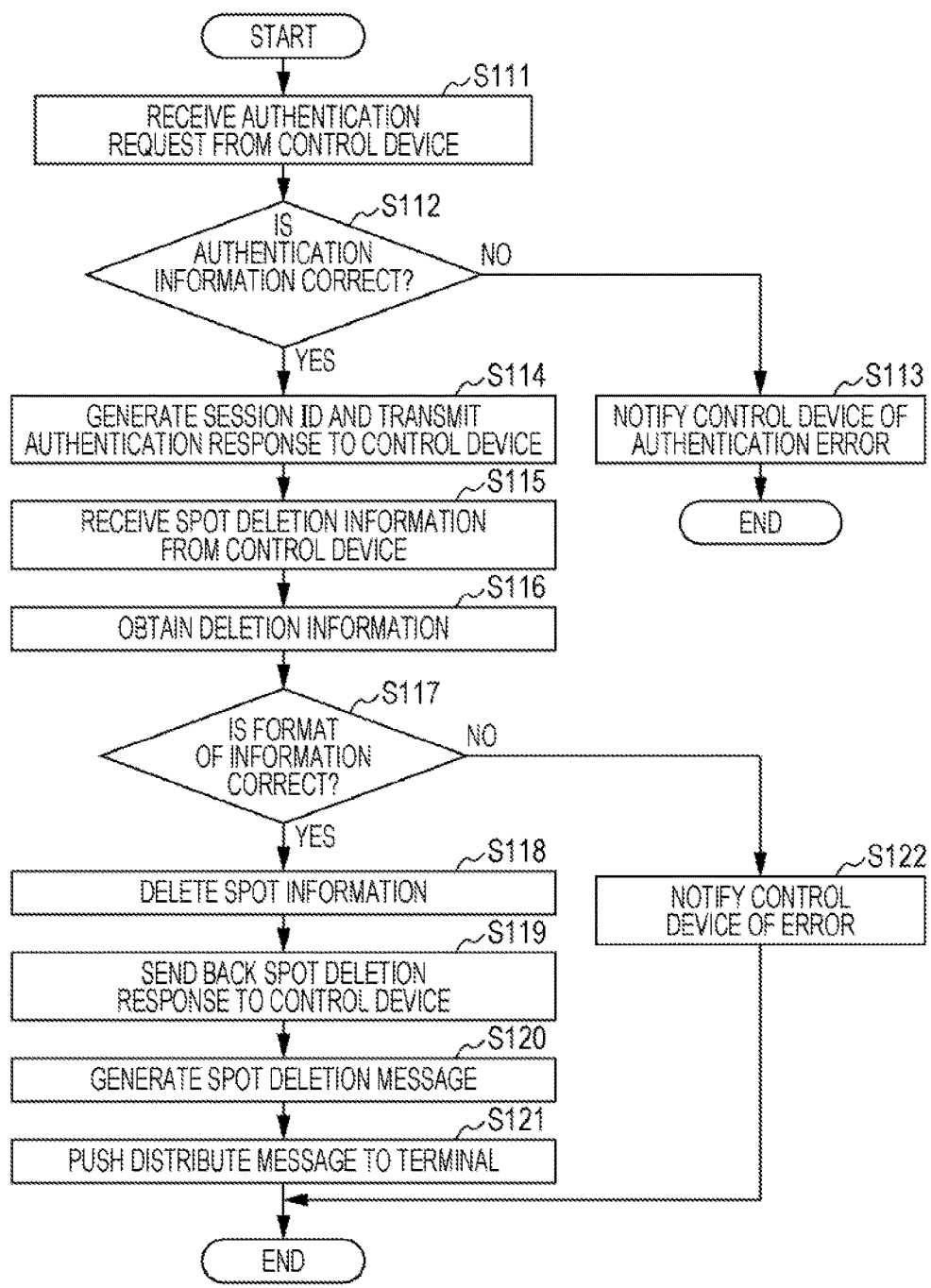
FIG. 22 is a flowchart illustrating an example of processing executed by the notification server at the time of notification of the termination of the open of the access point.

FIG. 22 is a flowchart illustrating an example of processing executed by the notification server at the time of notification of the termination of the open of the access point. The processing of Steps S111 to S114 is similar to the processing of Steps S41 to S44 described above with reference to FIG. 14. When the spot deletion request has been received from the control device 30, the obtaining unit 93 obtains deletion information included in the spot deletion request (Steps S115 and S116). The obtaining unit 93 determines whether the format of the obtained deletion information is correct (Step S117). When the format of the obtained deletion information is not correct, the obtaining unit 93 notifies the control device 30 of a format error of the information and ends a series of processing (No in Step S117, and Step S122). When the format of the deletion information is correct, the obtaining unit 93 deletes information on a spot that has been specified by the deletion information (Yes in Step S117, and Step S118). The obtaining unit 93 transmits a spot deletion response to the control device 30 through the communication unit 81 (Step S119). In addition, the message generation unit 94 generates a notification message (spot deletion message) destined for the terminal 15 (Step S120). The spot deletion message includes the information on the access point 20 in which it has been notified that the open due to the disaster setting had ended by the spot deletion request. The communication unit 81 push-distributes the spot deletion message to the terminal 15 (Step S121).

As described above, in the system according to the embodiment, due to notification of an occurrence of a disaster or notification of a warning for a disaster, disaster setting is performed on the access point 20 autonomously, and the terminal 15 of the user is push-notified of information on the access point 20 to which the disaster setting has been applied. Therefore, the user of the terminal 15 may know the presence or absence of the access point 20 to which the disaster setting has been applied before the user reaches the access point 20 to which the disaster setting has been applied by checking the display of the screen. As described above, the user may know that "there is a spot for communication in the vicinity of the location of the user" in the event of a disaster, and may get the feeling of safety after having obtained the information even when a public wireless communication line is congested and the communication is not allowed. In addition, due to the feeling of safety, the user may afford the judgement and action. Therefore, when the user goes to the access point 20 to which the disaster setting has been applied and selects whether the connection with the access point 20 is established, the communication congestion in the limited communication environment may be improved.

In addition, when the user approaches the opened access point 20, the notification server 80 notifies the terminal 15 of the user of information indicating that the terminal 15 is approaching the opened access point 20. Therefore, the information indicating the terminal 15 is approaching the access point 20 is also displayed on the screen of the terminal 15, so that it becomes easier for the user to notice the connectable access point 20. In addition, as assistance at the time of connection processing, information on the second identifier allowed to be used for connection with the opened access point 20 is also displayed on the screen of the terminal 15. Therefore, it becomes easier for the user of the terminal 15 to use the opened access point 20.

In addition, in the method according to the embodiment, when the open of the access point 20 ends, information on the access point 20 in which the open has ended is not transmitted from the notification server 80. Therefore, it may be suppressed that the user of the terminal 15 has wrong recognition due to reception of expired information. In addition, in the method according to the embodiment, useless communication due to transmission and reception of the old information that has expired is also emitted, thereby being efficient.

<Modifications>

As described above, the case in which the push server is the GCM 120 is described above as an example, but a certain push server other than the GCM 120 may be applied to the system depending on an implementation. As an example, processing when push notification from the notification server 80 to the terminal 15 is performed through apple push notification service (APNS) 130 is described below.

Figure 23:
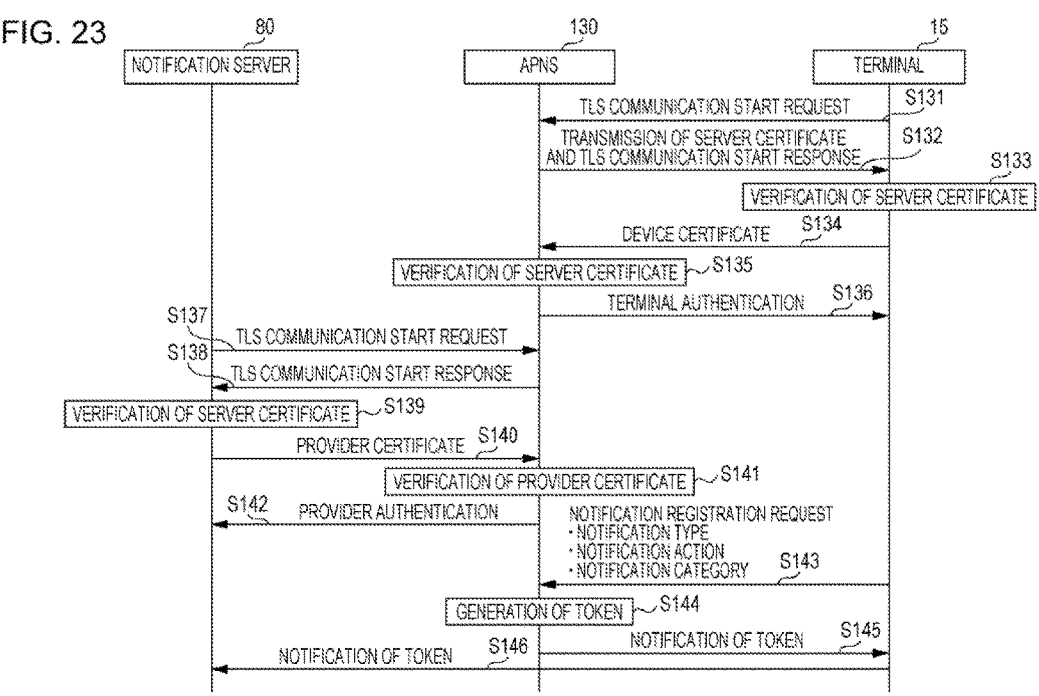
FIG. 23 is a sequence diagram illustrating an example of a registration method of the terminal.

FIG. 23 is a sequence diagram illustrating an example of a registration method of the terminal 15. Processing of steps S131 to S136 corresponds to connection processing between the APNS 130 and the terminal 15. The terminal 15 requests the APNS 130 to start transport layer security (TLS) communication (Step S131). The APNS 130 transmits a server certificate to the terminal 15 with a TLS communication start response (Step S132). The terminal 15 verifies the server certificate that has been received from the APNS 130 (Step S133). After that, the terminal 15 transmits a device certificate to the APNS 130 (Step S134). When the APNS 130 receives the device certificate, the APNS 130 verifies the received device certificate (Step S135). The APNS 130 transmits a terminal authentication to the terminal 15 (Step S136).

After that, the connection processing is executed even between the APNS 130 and the notification server 80 (Steps S137 to S142). The connection processing unit 96 of the notification server 80 requests to start TLS communication (Step S137). The APNS 130 transmits a server certificate to the notification server 80 with a TLS communication start response (Step S138). The connection processing unit 96 verifies the server certificate that has been received from the APNS 130 (Step S139). After that, the connection processing unit 96 transmits a provider certificate to the APNS 130 (Step S140). When the APNS 130 receives the provider certificate, the APNS 130 verifies the received provider certificate (Step S141). The APNS 130 transmits a provider authentication to the notification server 80 (Step S140).

After that, the terminal 15 transmits a notification registration request to the APNS 130 (Step S143). The notification registration request includes the notification type, the notification action, and the notification category. The notification type is information used to specify a warning sound, a display method, and the like of a notification message. The notification action is the type of processing executed by the terminal 15 at the time of reception of push notification. When a notification having a type that has been specified in the notification type occurs, the terminal 15 performs notification action corresponding to the notification type. The notification category is a value indicating a group when notification actions have been grouped. When the APNS 130 receives the notification registration request, the APNS 130 generates a token used for an identifier of the terminal 15 and notifies the terminal 15 of the generated token (Steps S144 and S145). The terminal 15 notifies the notification server 80 of the token that has been notified from the APNS 130 (Step S146).

Figure 24:
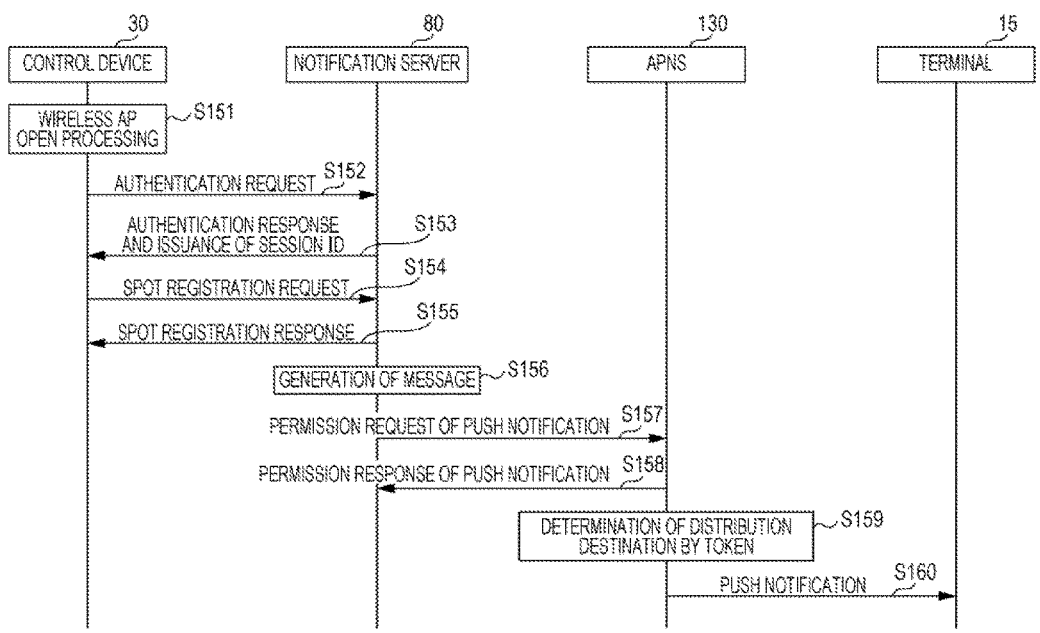
FIG. 24 is a sequence diagram illustrating an example of a notification method of the opened access point.

FIG. 24 is a sequence diagram illustrating an example of a notification method of the opened access point. The processing of FIG. 24 may be changed depending on an implementation. For example, processing of Step S158 may be performed after Steps S159 and S160. Processing of Steps S151 to S156 is similar to the processing of Steps S21 to S26 described above with reference to FIG. 10.

The message generation unit 94 of the notification server 80 requests permission of push notification for the APNS 130 (Step S157). A notification message destined for the terminal 15 that is a transmission destination and a token of the terminal 15 are transmitted to the APNS 130 with the permission request of push notification. The APNS 130 transmits a permission response of the push notification to the notification server 80 (Step S158). In addition, the APNS 130 determines the terminal 15 that is the distribution destination based on the token, and push-distributes the token and the message to the terminal 15 that is the distribution destination (Steps S159 and S160).

FIG. 25 is a sequence diagram illustrating an example of the notification method of the approach of the terminal to the access point and, the termination of the open of the access point. First, processing when the terminal 15 is approaching an access point is described with reference to Steps S170 to S175. The processing executed in Steps S170 and S171 is similar to the processing in Steps S61 and S62 described above with reference to FIG. 15. The message generation unit 94 of the notification server 80 transmits the generated message and the token of the terminal 15 that is the distribution destination to the APNS 130 with the permission request of the push notification (Step S172). The APNS 130 transmits the permission response of the push notification to the notification server 80 (Step S173). In addition, the APNS 130 determines the terminal 15 that is the distribution destination based on the token, and push-distributes the token and the message to the terminal 15 that is the distribution destination (Step S174, Step S175).

Processing when the open of an access point has ended is described below with reference to Steps S176 to S185. Processing executed in Steps S176 to S181 is similar to the processing of Steps S81 to S86 described above with reference to FIG. 19. Processing executed in Steps S182 to S185 is similar to the processing of Steps S172 to S175.

As described above, even when the APNS 130 is used as a push server instead of the GCM 120, the terminal 15 is notified of the open of the access point 20, the termination of the open of the access point 20, and the approach of the terminal to the opened access point 20. The terminal 15 may supply information on the access point 20 allowed to be used, to the user of the terminal 15 by displaying the notified information on the screen of the terminal 15.

<Others>

The embodiments are not limited to the above-described examples, and various modification may be made. The modification examples are described below.

The information elements included in the table, which are described above, are examples, and may be changed depending on an implementation. In addition, the display on the terminal 15 may also be changed depending on an implementation.

In any one of the embodiments, the transition instruction generation unit 51 of the control device 30 may confirm to the operator whether switching of the setting is performed, at the time of setting switching of an access point 20. In such a case, when the transition instruction generation unit 51 selects an access point 20 to which the disaster setting is to be applied using information included in the disaster information, the transition instruction generation unit 51 outputs information on the selected access points 20 to the display device 41 in order to present the list of the selected access points 20. At that time, the transition instruction generation unit 51 may output the second identifier used for connection of the disaster setting to the display device 41 with the information on the access point 20 that is an application target of the disaster setting. After that, the transition instruction generation unit 51 waits until a change request is obtained from the operator. The change request is input from the input device 42 or the like. When the transition instruction generation unit 51 obtains a change request from the operator, the transition instruction generation unit 51 performs control so as to change the setting of the selected access point 20.

The method in which the termination of the open of the access point 20 is determined may also be changed depending on an implementation. For example, the control device 30 may end the open by the disaster setting when a certain time period has elapsed after having received a notification from the disaster information alarm device 10.

All examples and conditional language recited herein are intended for pedagogical purposes to aid the reader in understanding the invention and, the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium having stored therein an access point notification control program that causes a processor that controls one or more access points to execute a process, the process comprising:

identifying an access point based on disaster information when the disaster information is obtained and transmitting, to the access point, a first transition instruction to instruct a transition of a setting of the access point to a disaster setting by which communication using a second identifier, different from a first identifier for which the access point allows communication, is allowed;

transmitting, to a notification server that holds information on a terminal allowed to be connected to the one or more access points, a request for authentication information used for registration of information to be provided to the terminal;

registering information regarding the access point the setting of which is transferred to the disaster setting, in the notification server, using the authentication information issued in response to the request; and causing the notification server to generate a message based on the information regarding the access point the setting of which is transferred to the disaster setting, and notify the terminal of the message.

2. The storage medium having stored therein the access point notification control program according to claim 1, wherein the information regarding the access point the setting of which is transferred to the disaster setting includes location information and area information of the access point, and the process further comprises;

causing the notification server to determine whether the terminal enters an area indicated by the area information, based on location information on the terminal, which is notified from the terminal, and registered area information, and transmit, to the terminal that enters the area, information on an access point corresponding to the area together with the second identifier.

3. The storage medium having stored therein the access point notification control program according to claim 1, wherein the process further comprises;

transmitting a second transition instruction used to instruct the access point that is set as a disaster setting target using the disaster information to end the disaster setting when a time that elapses after the disaster information is obtained exceeds a certain time period, and transmitting, to the notification server, a further request for further authentication information used to delete information provided to the terminal allowed to be connected to the one or more access points,
causing the notification server to delete information regarding the access point in which the disaster setting ends from information distributed by the notification server, using the further authentication information issued in response to the further request, and
causing the notification server to notify the terminal of the information regarding the access point in which the disaster setting ends.

4. The storage medium having stored therein the access point notification control program according to claim 1, wherein
the process further comprises;
extracting a combination of a disaster type, a scale, and an occurrence point notified as the disaster information, and
selecting an access point, as a disaster setting target, in which the combination matches a condition in which the disaster setting is performed.

5. A control device that controls one or more access points comprising:
a memory; and
a processor coupled to the memory, the processor executing a process, the process including:
identifying an access point based on disaster information when the disaster information is obtained;
generating a first transition instruction to instruct a transition of a setting of the access point to a disaster setting by which communication using a second identifier different from a first identifier for which the access point allows communication is allowed,
transmitting the first transition instruction to the access point and transmitting, to a notification server that holds information on a terminal allowed to be connected to the one or more access points, a request for authentication information used for registration of information to be provided to the terminal,
registering information regarding the access point the setting of which is to be transferred to the disaster setting, in the notification server, using the authentication information issued in response to the request, and
causing the notification server to generate a message based on the information regarding the access point the setting of which is transferred to the disaster setting, and notify the terminal of the message.

6. The control device according to claim 5, wherein
the information regarding the access point the setting of which is transferred to the disaster setting includes location information and area information of the access point, and
the process further includes;
causing the notification server to determine whether the terminal enters an area indicated by the area information, based on location information on the terminal, which is notified from the terminal, and registered area information, and to notify the terminal that enters the area of information on an access point corresponding to the area and the second identifier.

7. The control device according to claim 5, wherein
the process further includes;
generating a second transition instruction used to instruct the access point that is set as a disaster setting target using the disaster information to end the disaster setting when a time that elapses after the disaster information is obtained exceeds a certain time period,
transmitting the second transition instruction to the access point, and transmitting a further request for further authentication information used to delete information provided to a terminal allowed to be connected to the one or more access points to the notification server, and
causing the notification server to delete information regarding the access point in which the disaster setting ends from information registered as information distributed by the notification server, using the further authentication information issued in response to the further request, and to notify the terminal of the information regarding the access point in which the disaster setting ends.

8. An access point notification method causing a control device that controls one or more access points to execute a process, the process comprising:
identifying an access point based on disaster information and transmitting, to the access point, a first transition instruction to instruct a transition of a setting of the access point to a disaster setting by which communication using a second identifier, different from a first identifier for which the access point allows communication, is allowed;
transmitting, to a notification server that holds information on a terminal that is a distribution destination, which is allowed to be connected to the one or more access points, a request for authentication information used for registration of information to be provided to the terminal;
notifying the notification server of the information regarding the access point the setting of which is transferred to the disaster setting, using the authentication information issued in response to the request; and
causing the notification server to register the information regarding the access point the setting of which is transferred to the disaster setting and transmit a notification message used to perform notification of the information regarding the access point to the terminal that is the distribution destination.

9. The access point notification method according to claim 8, wherein
the control device transmits location information regarding the access point and area information associated with the access point to the notification server as the information regarding the access point the setting of which is transferred to the disaster setting, and
the notification server
determines, when location information on the terminal that is the distribution destination is received, whether the terminal enters an area indicated by the area information, and
notifies the terminal that enters the area of the information regarding the access point corresponding to the area and the second identifier.

10. The access point notification method according to claim 8, wherein
the control device
transmits a second transition instruction used to instruct the access point that is a disaster setting target using the disaster information to end the disaster setting when a time that elapses after the disaster information is obtained exceeds a certain time period,
transmits, to the notification server, a further request for further authentication information used to delete information provided to a terminal allowed to be connected to the one or more access points, and notifies the notification server of information on an access point in which the disaster setting ends using the further authentication information issued in response to the further request, and the notification server deletes the information regarding the access point in which the disaster setting ends from information registered as a distribution target and transmits, to the terminal that is the distribution destination, a further notification message used to perform notification indicating that application of the disaster setting in the access point ends.

* * * * *